United States Patent
Suzuki et al.

(10) Patent No.: US 7,261,472 B2
(45) Date of Patent: Aug. 28, 2007

(54) ULTRA-SMALL, FORM FACTOR SINGLE FIBER OPTICAL INTERCONNECT SYSTEM, WITH PUSH-PUSH TYPE INSERTION/WITHDRAWAL MECHANISM AND SHUTTERED MODULAR CONNECTOR AND SHUTTERED ADAPTER AND METHOD FOR USING SAME

(75) Inventors: Toshio Suzuki, Saitama (JP); Gregory Bunm, Deerfield, IL (US)

(73) Assignees: Illum Technologies, Inc., Northbrook, IL (US); Adamant Kogyo Co., Ltd., Tokyo (JP)

( * ) Notice: Subject to any disclaimer, the term of this patent is extended or adjusted under 35 U.S.C. 154(b) by 0 days.

(21) Appl. No.: 11/155,360

(22) Filed: Jun. 17, 2005

(65) Prior Publication Data

US 2006/0153503 A1     Jul. 13, 2006

Related U.S. Application Data

(63) Continuation-in-part of application No. 11/036,306, filed on Jan. 12, 2005, now abandoned.

(51) Int. Cl.
*G02B 6/38* (2006.01)

(52) U.S. Cl. ............... 385/75; 385/60; 385/62; 385/72

(58) Field of Classification Search ............... 385/56, 385/62
See application file for complete search history.

(56) References Cited

U.S. PATENT DOCUMENTS

| | | | |
|---|---|---|---|
| 4,726,647 A * | 2/1988 | Kakii et al. ............... | 385/60 |
| 5,214,730 A | 5/1993 | Nagasawa et al. | |
| 5,317,663 A * | 5/1994 | Beard et al. ............... | 385/70 |
| 5,734,778 A * | 3/1998 | Loughlin et al. ........... | 385/140 |
| 5,838,856 A | 11/1998 | Lee | |
| 6,238,278 B1 | 5/2001 | Haftman | |
| 6,634,796 B2 * | 10/2003 | de Jong et al. ............ | 385/56 |

(Continued)

OTHER PUBLICATIONS

Research at Photonics Laboratories (4-5); MU-type Angled-PC Connector, Copyright 2004, Nippon Telegraph & Telephone Corporation, 1 page.
HMU Series: MU Type Fiber Optics Connectors, 20 pages.

*Primary Examiner*—Kevin Wood
*Assistant Examiner*—Jerry T Rahll
(74) *Attorney, Agent, or Firm*—Patzik, Frank & Samotny Ltd.

(57) ABSTRACT

An optical fiber interconnect system comprising a connector for carrying an optical fiber along a longitudinal axis. The adapter comprises a push-push coupling mechanism configured to receive and couple with the connector upon application of a first pushing force to the connector so as to removably receive the connector in operably connected fashion. The connector is disengaged from the adapter upon application of a second pushing force upon the connector to enable withdrawal of the connector from the adapter. The pushing forces can be applied to the connector at a pushing region by using a stylus member. A zero rotation embodiment provides for linear or curvilinear, non-rotational movement of the ferrule within the connector relative to the optical axis for better alignment and tunability. A movable plug extender is provided within the ferrule holder to facilitate injection of adhesive and protect fiber from breakage during the termination process and thereafter.

25 Claims, 30 Drawing Sheets

U.S. PATENT DOCUMENTS

| | | |
|---|---|---|
| 6,695,489 B2 * | 2/2004 | Nault .......................... 385/78 |
| 6,823,109 B2 | 11/2004 | Sasaki et al. |
| 6,886,990 B2 | 5/2005 | Taira et al. |
| 6,918,704 B2 | 7/2005 | Marrs et al. |
| 6,934,450 B2 | 8/2005 | Hiramatsu |
| 2005/0286833 A1 | 12/2005 | Kramer et al. |
| 2006/0067627 A1 * | 3/2006 | Crews et al. ................. 385/59 |

* cited by examiner

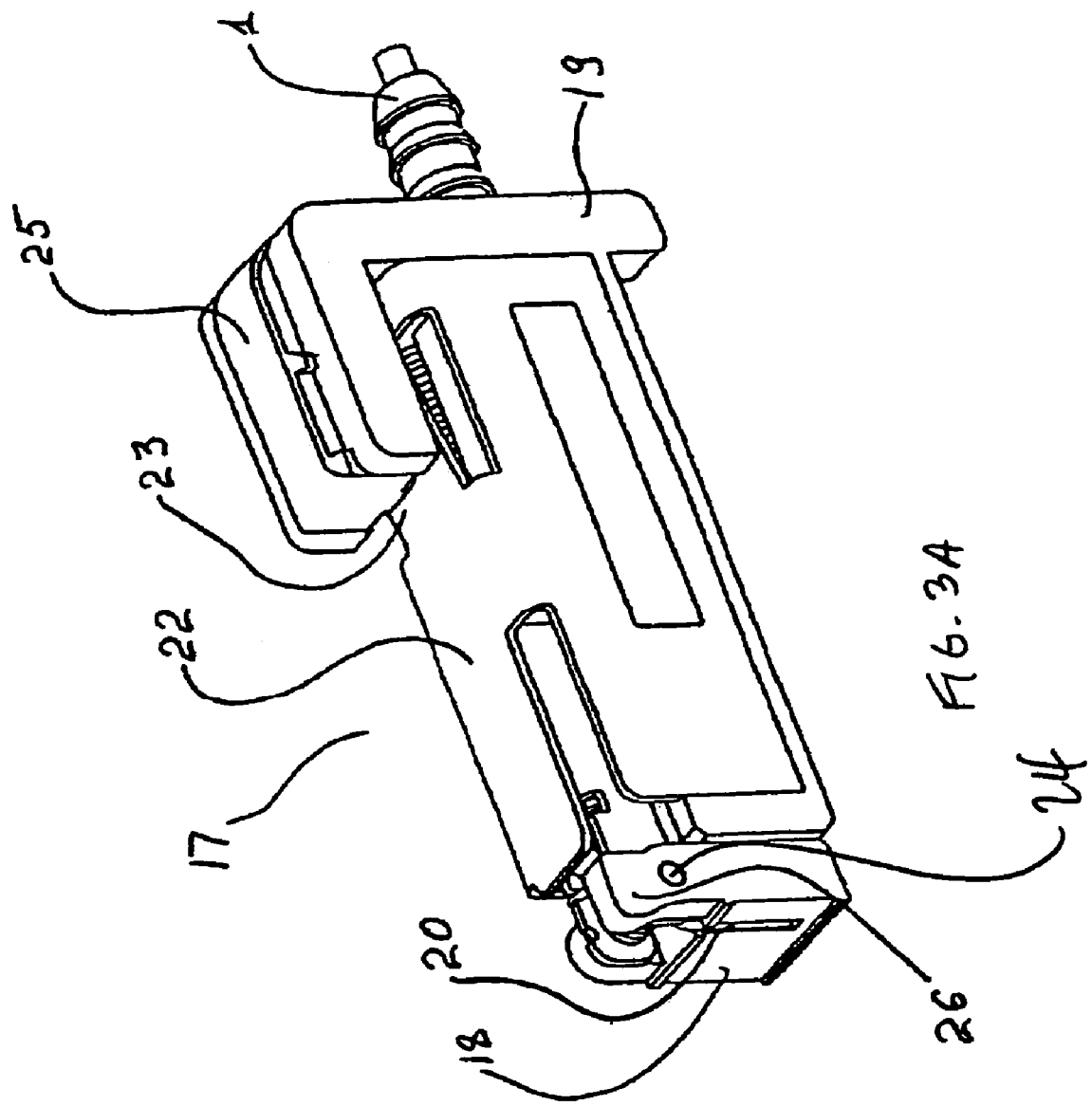

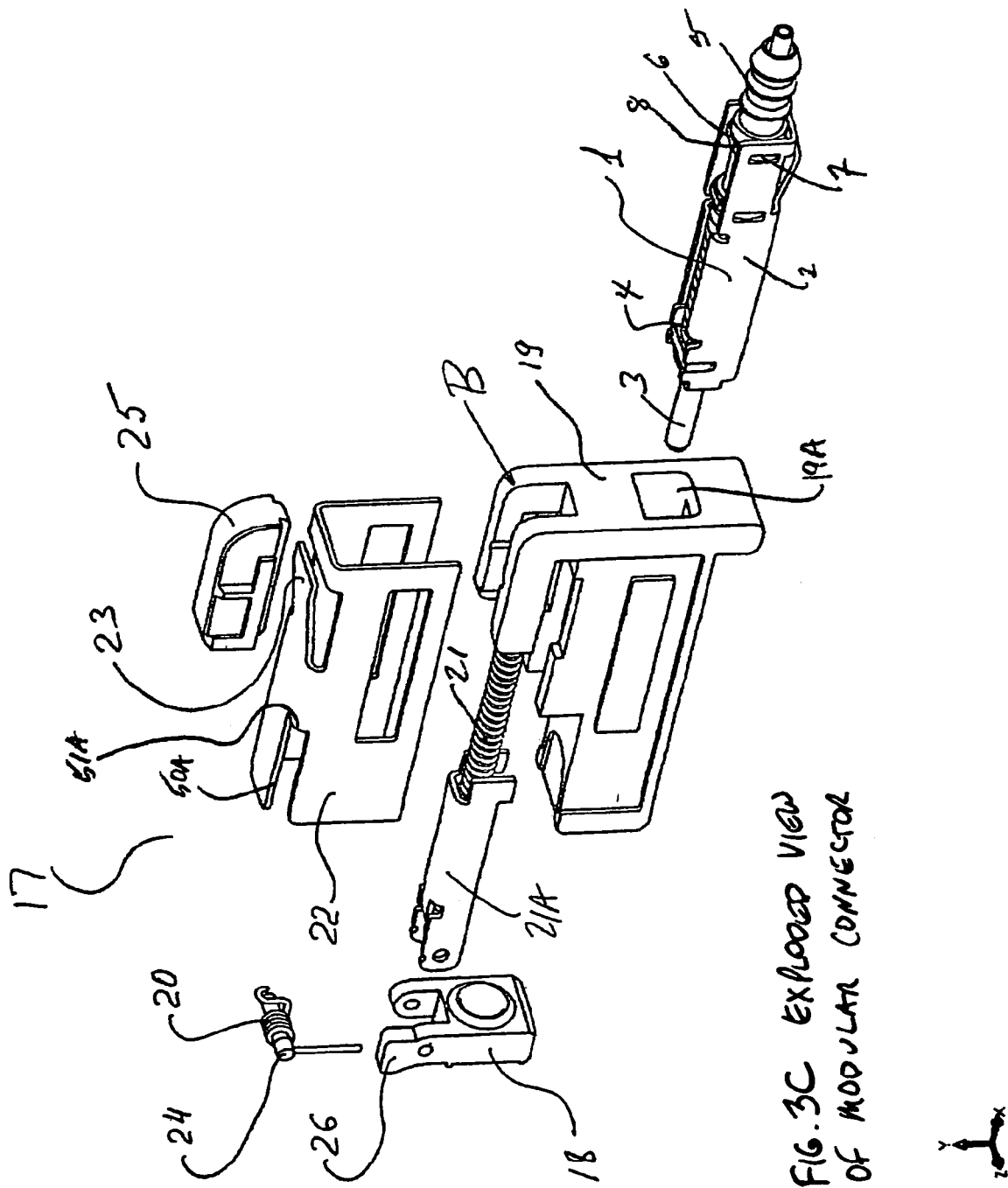
FIG. 3C EXPLODED VIEW OF MODULAR CONNECTOR

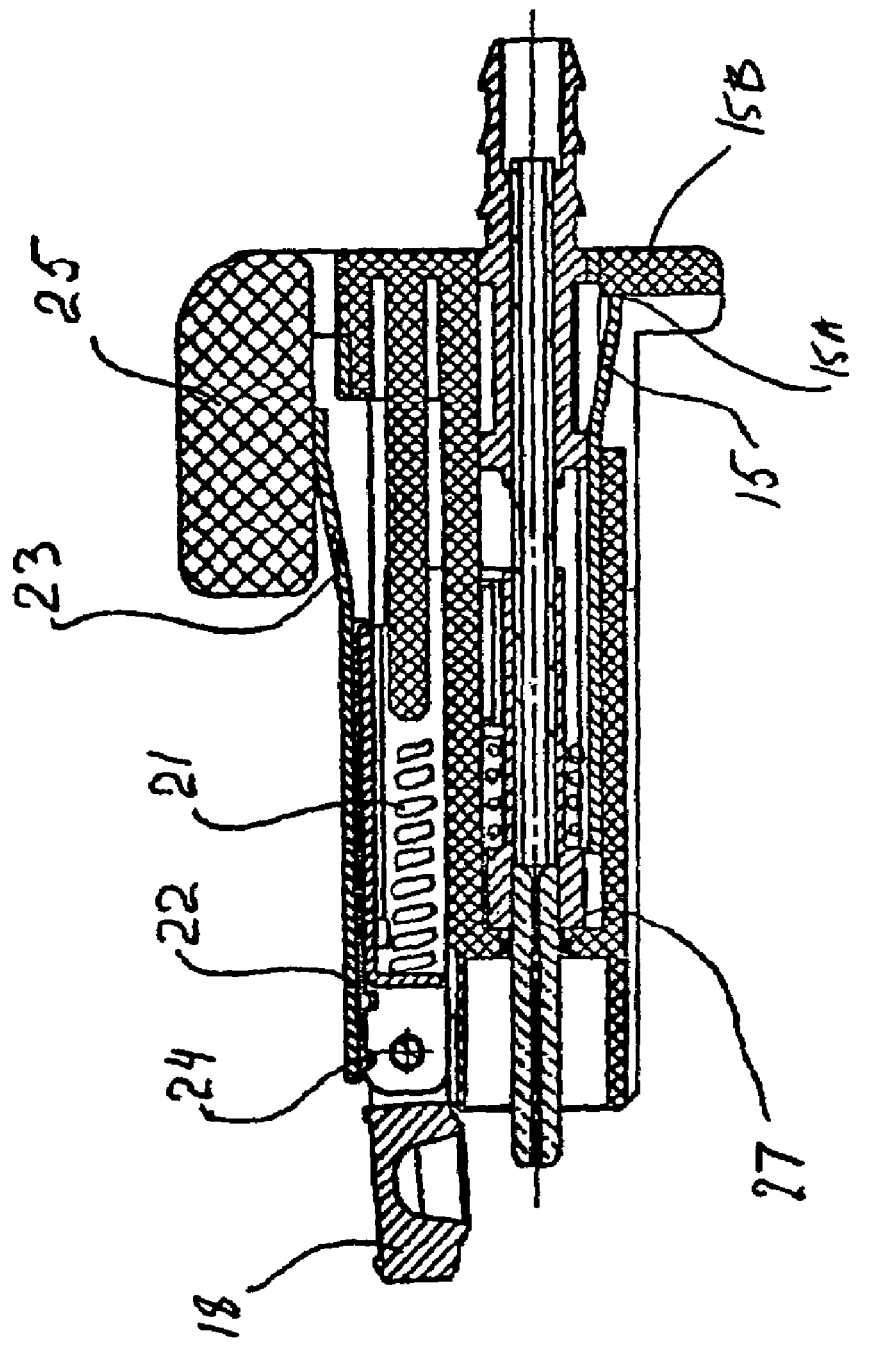

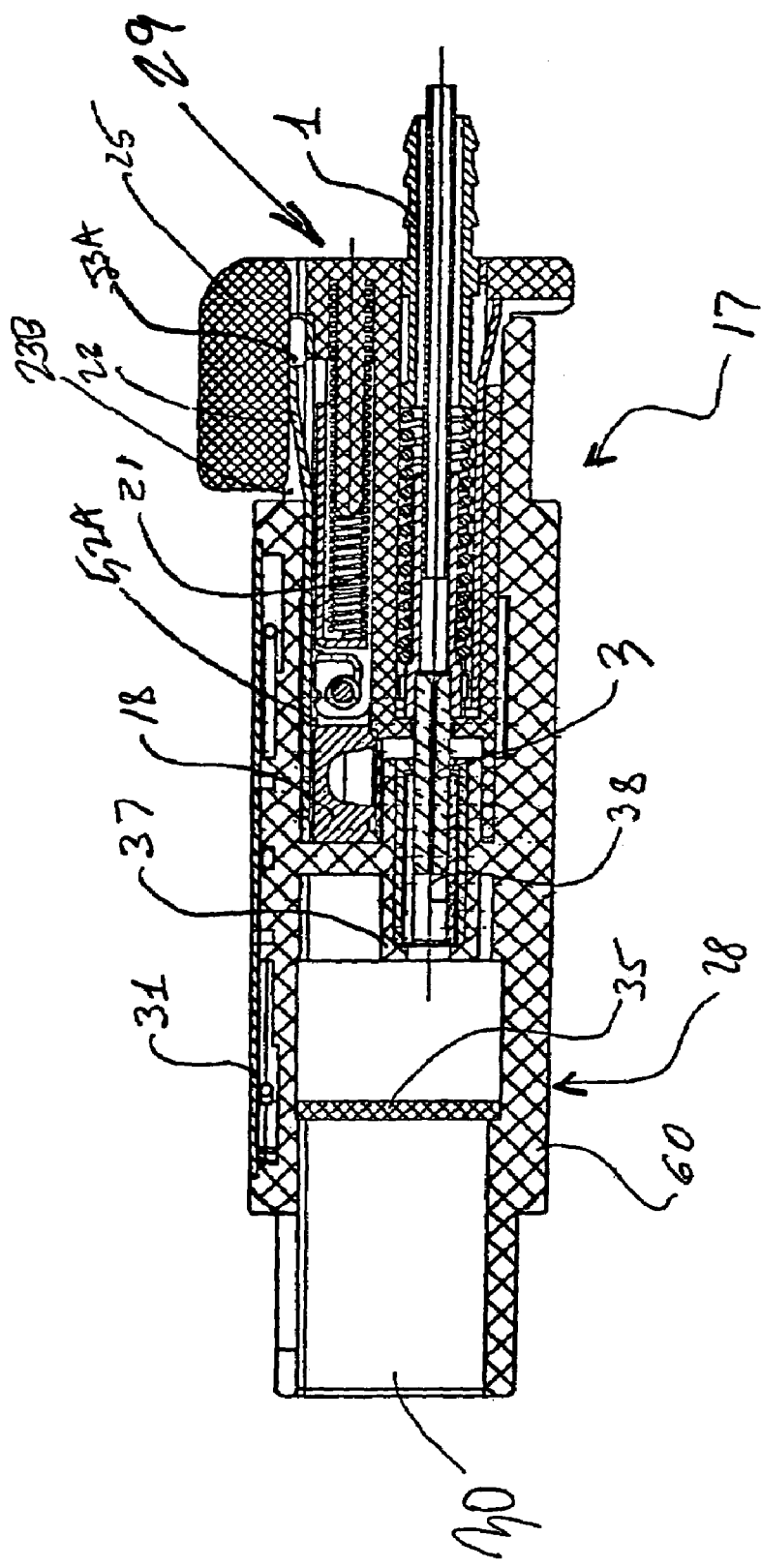
FIG. 7A LONGITUDINAL SECTION OF CONNECTOR/ADAPTER SYSTEM

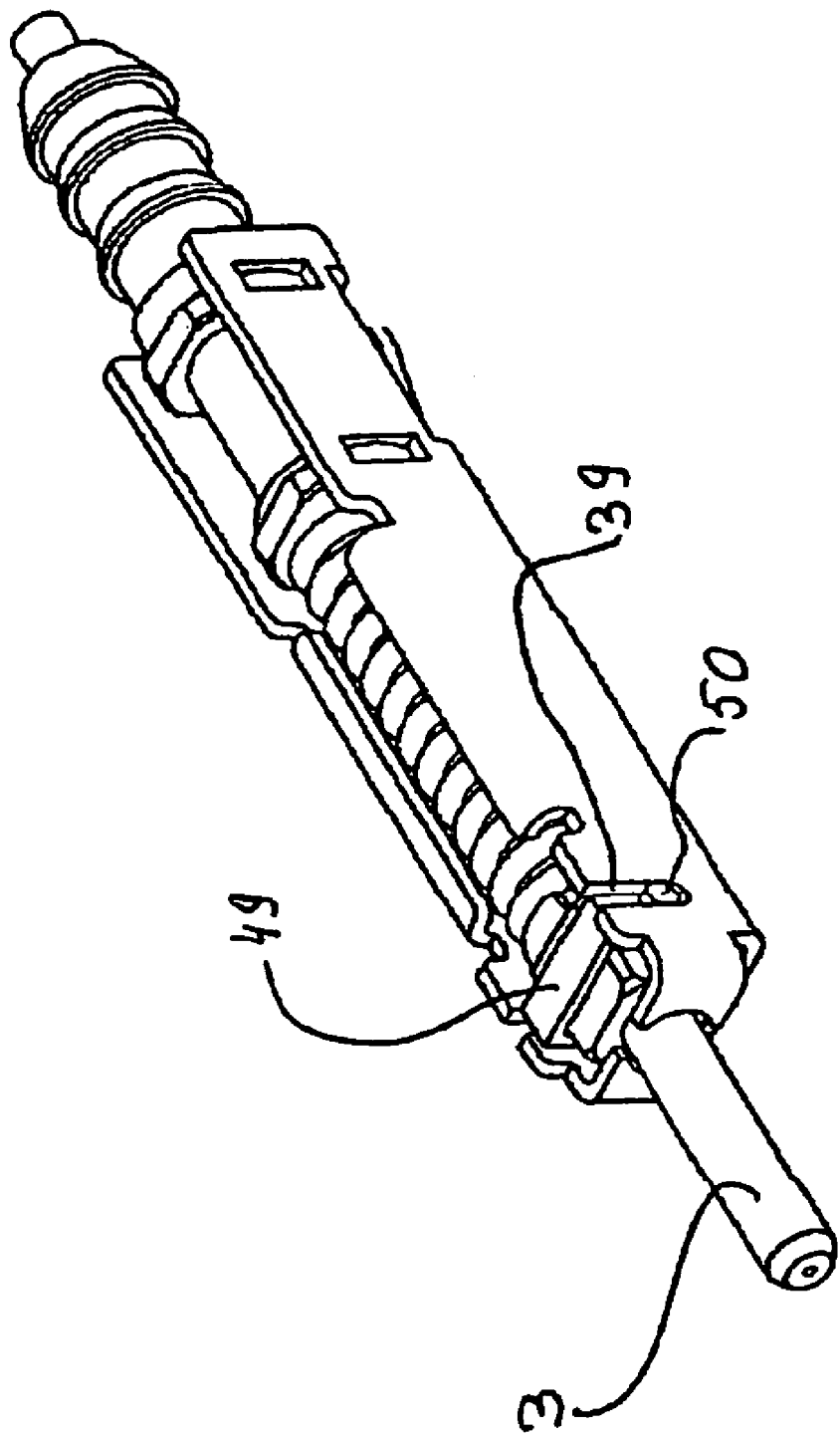

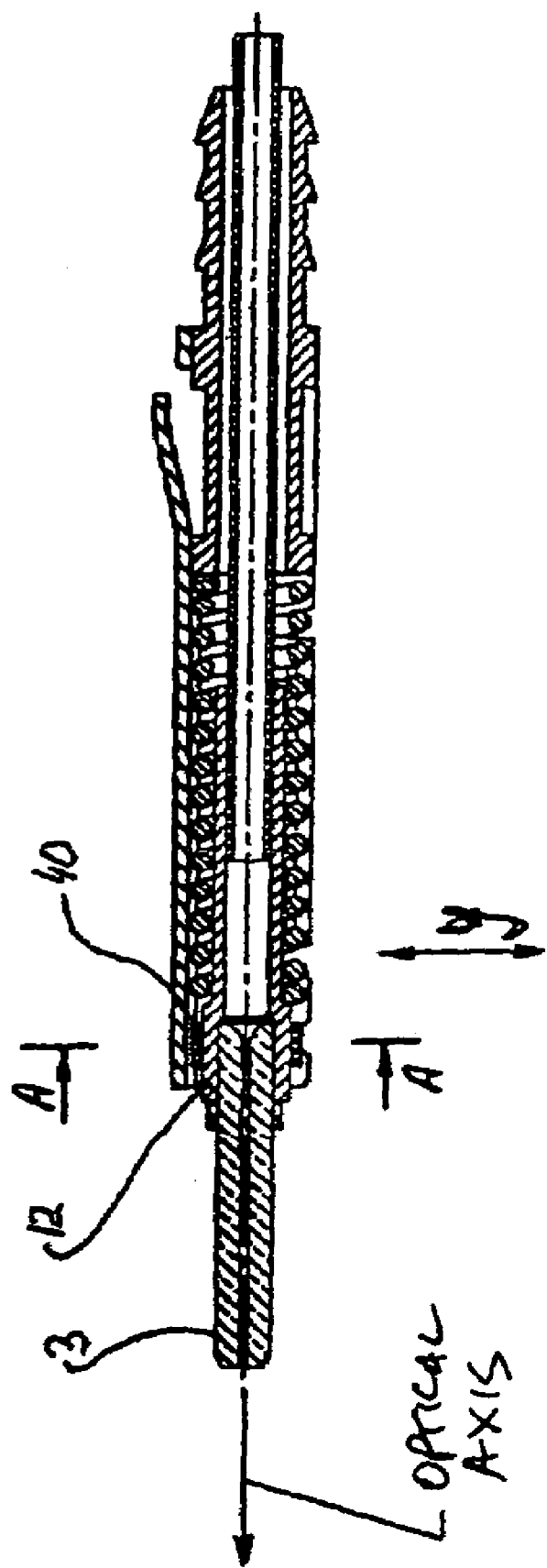

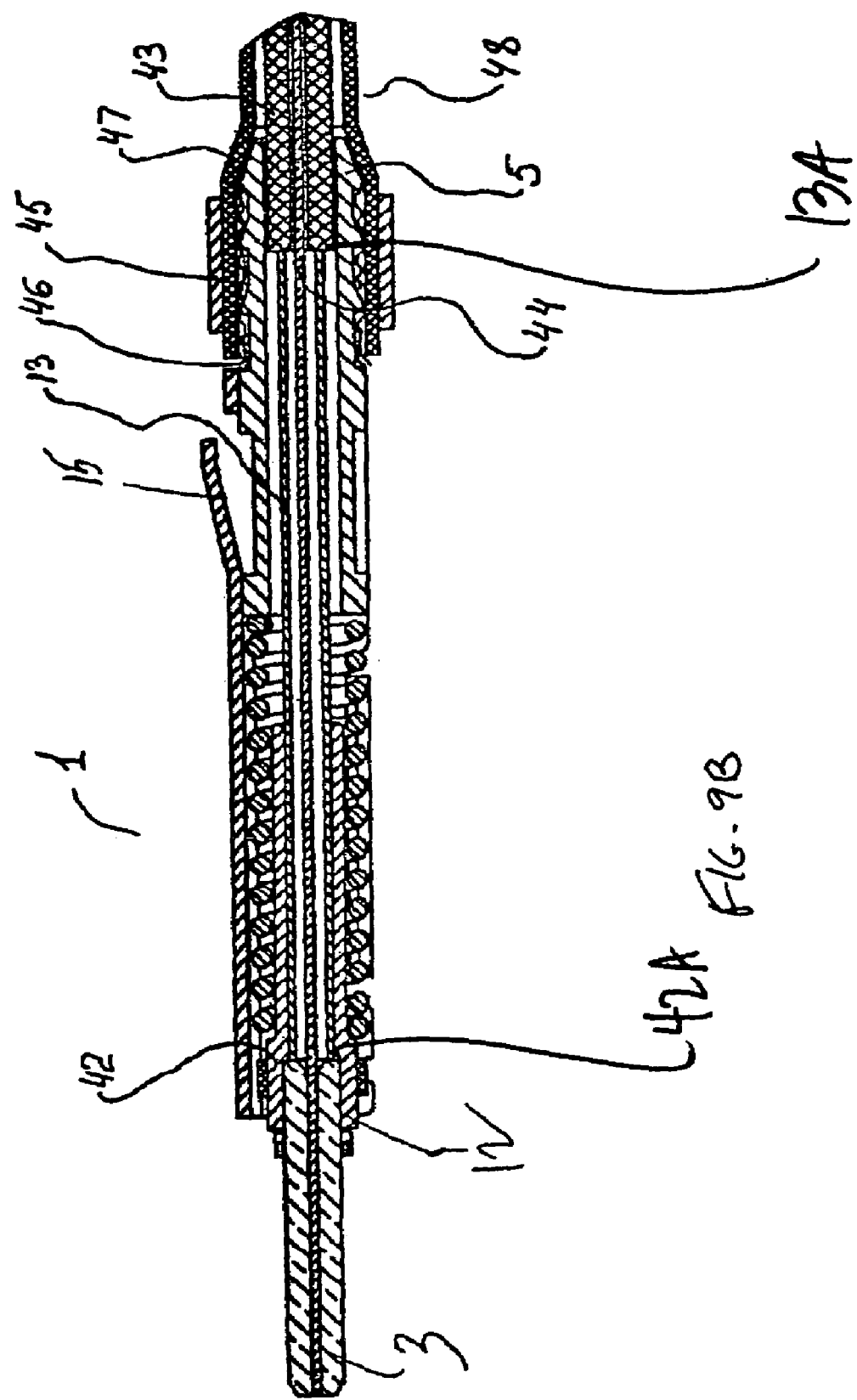

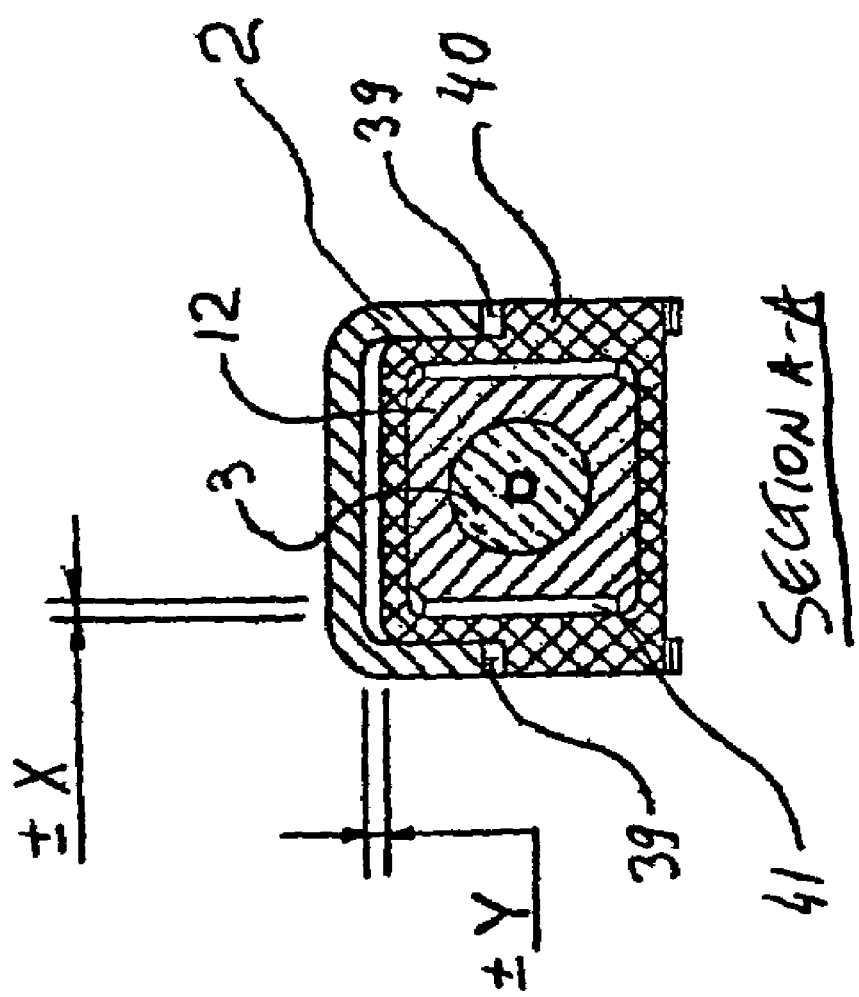

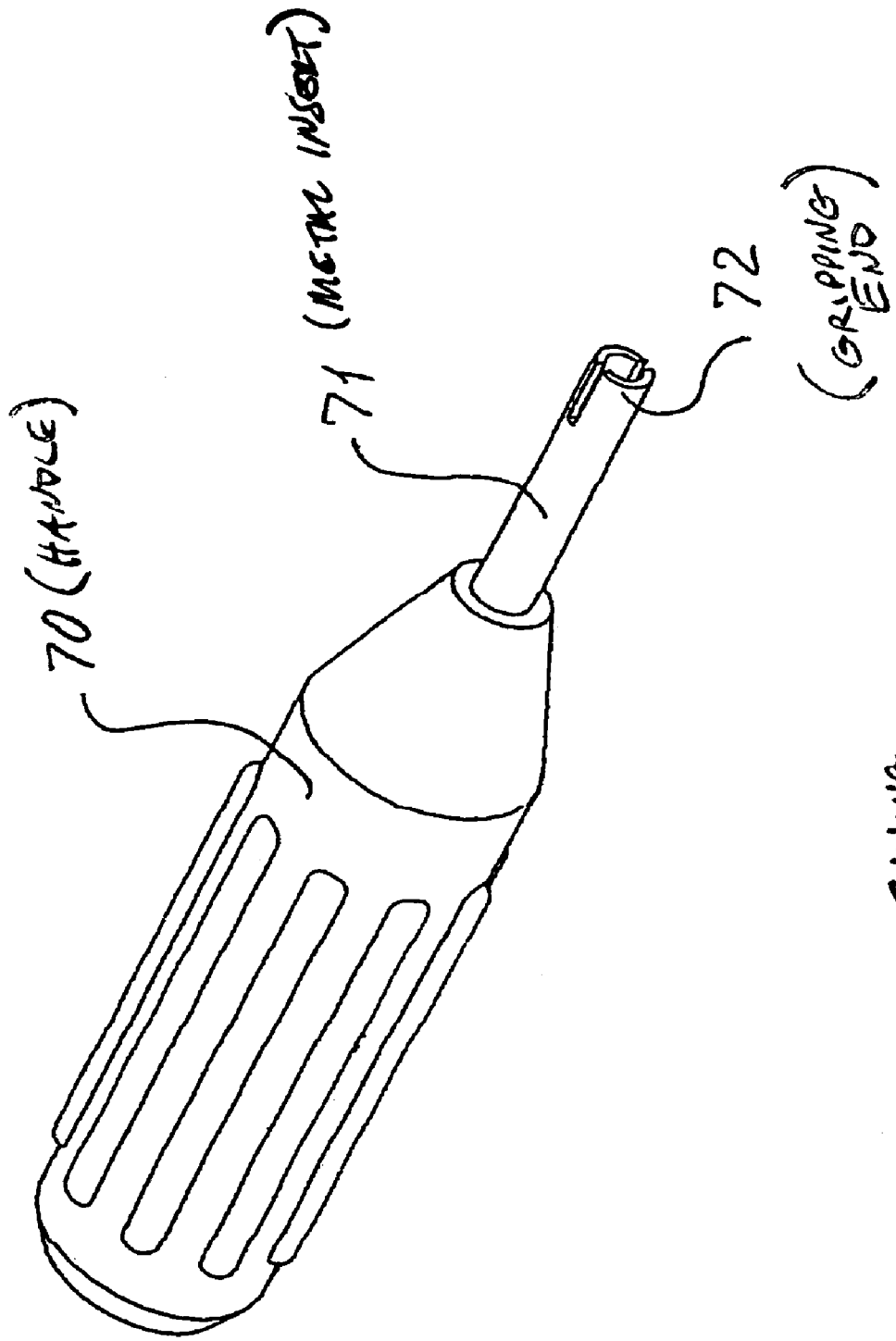
FIG. 10A TUNING TOOL

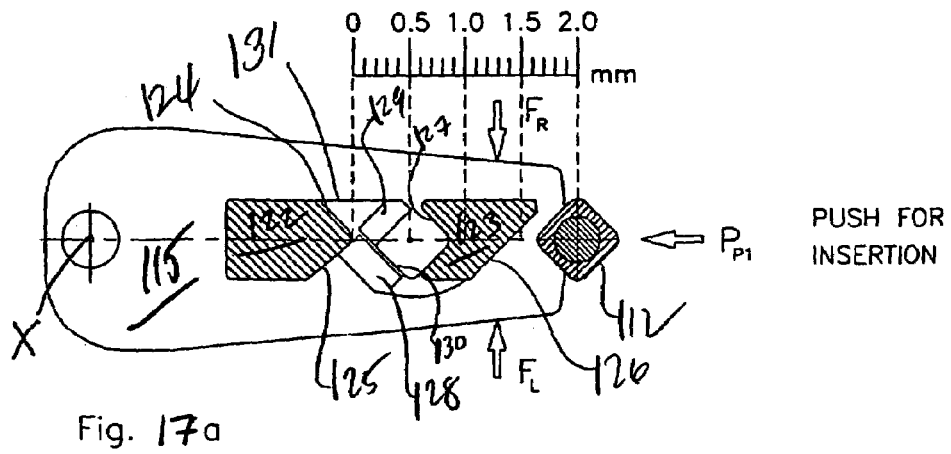
Fig. 17a — PUSH FOR INSERTION
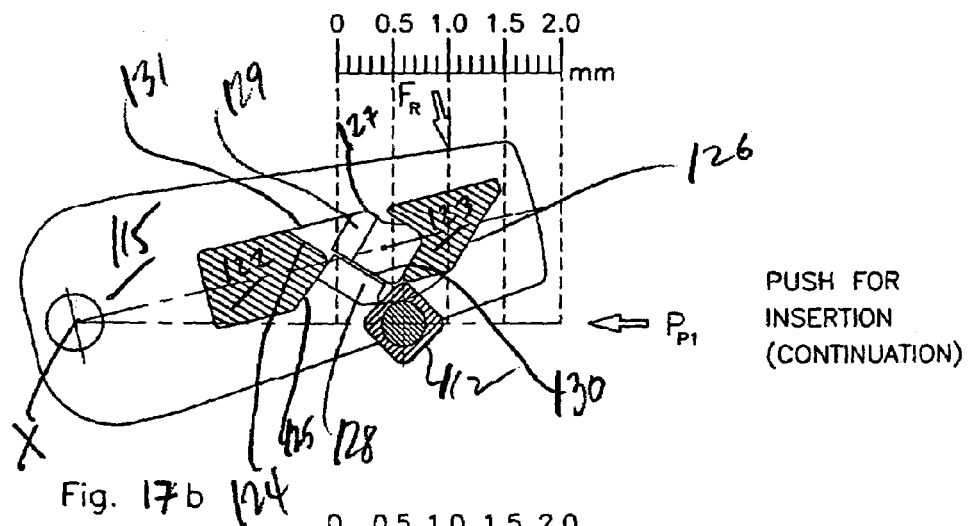
Fig. 17b — PUSH FOR INSERTION (CONTINUATION)
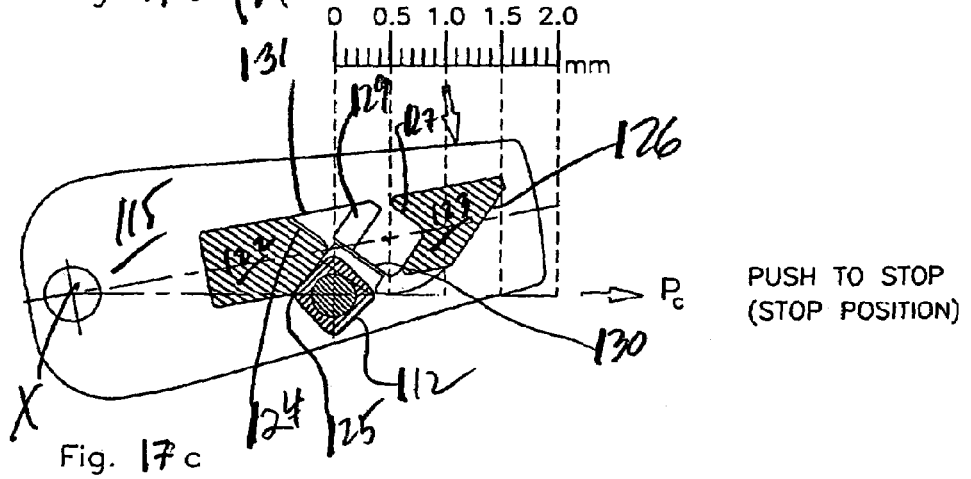
Fig. 17c — PUSH TO STOP (STOP POSITION)

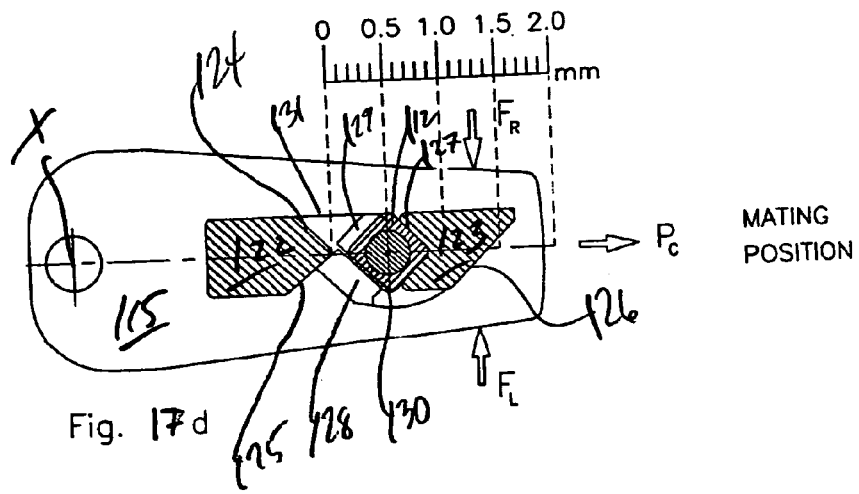
Fig. 17d — MATING POSITION
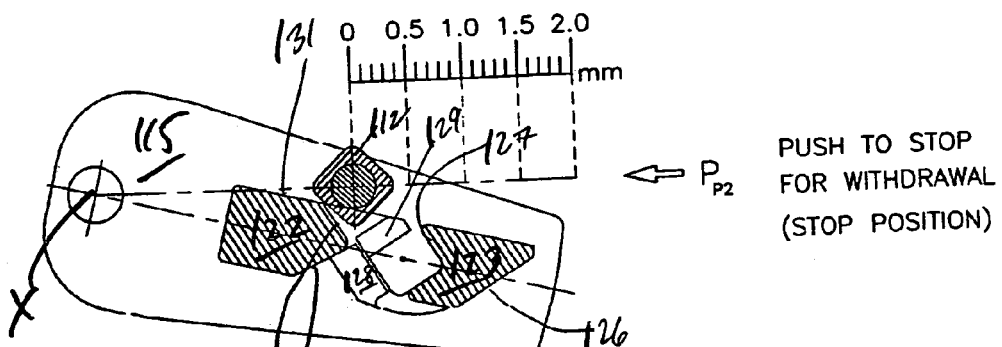
Fig. 17e — PUSH TO STOP FOR WITHDRAWAL (STOP POSITION)
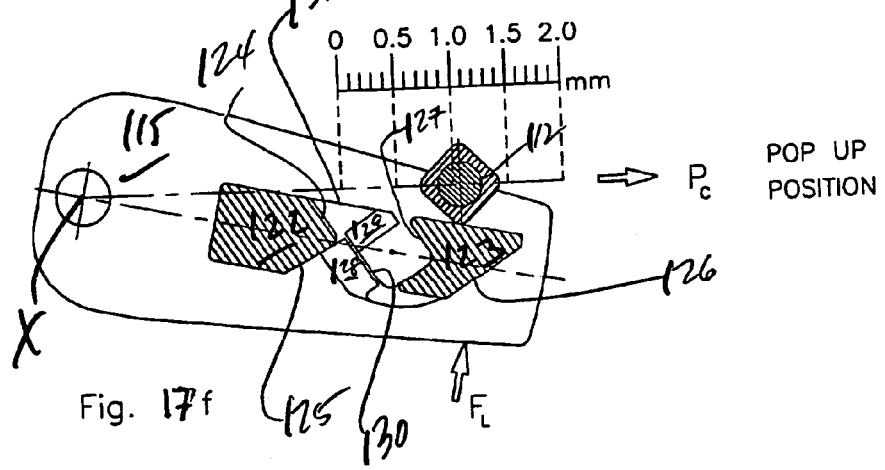
Fig. 17f — POP UP POSITION

ULTRA-SMALL, FORM FACTOR SINGLE FIBER OPTICAL INTERCONNECT SYSTEM, WITH PUSH-PUSH TYPE INSERTION/WITHDRAWAL MECHANISM AND SHUTTERED MODULAR CONNECTOR AND SHUTTERED ADAPTER AND METHOD FOR USING SAME

CONTINUING APPLICATION INFORMATION

This is a continuation-in-part application of application Ser. No. 11/036,306 entitled Ultra-Small, Form Factor Single Fiber Optical Interconnect System With Shuttered Connector and Shuttered Adapter filed on Jan. 12, 2005 now abandoned.

FIELD OF INVENTION

The invention relates to fiber optics interconnect systems and, more particularly, to an ultra-small, form factor low-loss single fiber optic interconnect system consisting of fiber connector plugs and corresponding adapters for the precise end-to-end mating of fiber optic cables. More particularly, the invention further relates to an interconnect system consisting of modular fiber optic connectors and corresponding adapters with a "push-push" insertion/withdrawal mechanism method for using same.

BACKGROUND OF INVENTION

In the fiber optics field, the need frequently arises to connect or disconnect connectors and adapters arise in both single channel or multiple channel connectors and adapters. The invention here disclosed applies primarily to single fiber applications. There is a continuously increasing demand for higher density interconnect systems in fiber optics applications, especially in those cases where multiple fiber connectors or multiple fiber ferrules are not conveniently reachable due to small size, routing or other considerations.

Generally, modern single fiber optical connector plugs are manufactured with ferrule diameters ranging from 1.25 to 2.5 millimeters. The introduction of sub-millimeter diameter ferrules has resulted in miniature single fiber optical connectors and adapters that allow very high density configurations. In the fiber optics field the need frequently arises to transfer light from one fiber to another either permanently or temporarily. Optical connector plugs are one of the solutions used for this purpose. Fibers terminated with optical connector plugs can be coupled together and disconnected when necessary, either to end the connection or to route the light to a different fiber. Optical connector plugs can be of the single or multiple fiber variety. Single fiber connector plugs (simplex connector plugs) provide the connection of only one fiber to another single fiber. In multiple fiber connector plugs several fibers are simultaneously coupled with another set of similar fibers. The invention here disclosed applies primarily to single fiber applications.

Traditionally, in simplex connector plugs the connection is achieved by the use of cylindrical ferrules. The ferrules, which can be manufactured from several materials, including ceramics, metal, plastic and glass, have in their center a coaxial channel of a diameter slightly larger than the optical fiber. The optical fiber is inserted in the channel and maintained fixed by the use of adhesives, such as epoxy, or mechanical clamping. One end of the fiber is made to be flat or protrude slightly from the end surface of the ferrule and is then terminated, generally by a polishing procedure or other means that provide a very smooth surface.

Two connectors (otherwise referred to as "connector plugs") are mated with the help of an adapter. The connector plugs comprise the ferrule and the ferrule holder. The adapter has in most cases an internal cylindrical sleeve that aligns the ferrules of both connector plugs. Modern fiber optic connectors usually have a spring mechanism that pushes the ferrules towards one another with a controlled force, in order to achieve physical contact of both fiber ends, thereby improving the optical performance of the connection.

The termination or polishing of the fiber ends is a very involved and delicate procedure which results in the fiber position being either slightly below or above the ferrule end-face surface. The protrusion of the fiber from the ferrule end has to be controlled to very tight tolerances in order to avoid damage of the fiber ends when in physical contact. The pressure between fibers has to be kept in a narrow range in order to keep the glass in its elastic region and thereby prevent fiber rupture as well as preventing the movement of the fibers inside the ferrule channels (pistoning) when the two connector plugs are mated. It is also very important to obtain a very smooth surface free of scratches and other defects, especially in the central core section of the fiber where the light travels. In particular, since ferrule ends and fibers are generally polished together, it is necessary to prevent released ferrule material from damaging the fiber ends during this procedure. The introduction of very small ferrule diameters makes it easier and faster to polish the fiber during the polishing procedure.

Keeping fiber optic connector plugs free from contaminants such as dirt or dust is also very important. Dirt or dust on fiber ends can scatter or absorb light, causing excessive loss of signal and corresponding poor system performance. Presence of contaminants inside the connector plug could cause misalignment with similar consequences. Likewise, because of the intensity of the light being transferred, it is important to shelter users from unintended viewing so as to prevent eye injury.

There is also a continuously increasing demand for higher density interconnect systems in fiber optics applications, especially in those cases where multiple fiber connector plugs or multiple fiber ferrules are not convenient due to routing or other considerations. Generally, modern single fiber optical connector plugs are manufactured with ferrule diameters ranging from 1.25 to 2.5 millimeters. The introduction by the present invention of sub-millimeter diameter ferrules has resulted in a very small single fiber optical connector plug that allows very high density configurations.

SUMMARY OF INVENTION

One object of present invention is to provide a very small footprint, single fiber optical interconnect system suitable for high density applications which has a push-push mechanism for quick and convenient connect/disconnect operation in an environment where it is difficult to reach and activate a conventional fiber optical interconnect system. One embodiment of the system disclosed herein comprises two miniature connectors and an adapter. The miniature connectors can handle sub-millimeter diameter ferrules so as to enable the acceptance of bare and cabled fiber optics. The push-push mechanism is controlled by the connector's internal spring as well as by two identical springs in the adapter, and works automatically when miniature connectors are connected or disconnected to or from the interior of the adapter. In this version of the invention, pushing a first time on the connector connects the connector to the adapter. Pushing on the connector a second time, serves to disconnect the connector from the adapter.

Another object of the invention is to provide a very small footprint, single fiber optical interconnect system suitable for high density applications. Another embodiment of the system disclosed herein comprises two modular connectors and an adapter. The modular connectors can handle sub-millimeter diameter ferrules in an embodiment to accept bare and cabled fiber optics. In this version of the invention, dust and laser protection shutters are included in both modular connectors and adapters. These shutters are controlled by a spring mechanism, and open and close automatically when modular connectors and adapters are attached or separated. Latches are also included that keep the connection securely together and a release mechanism that actively uncouples the modular connector and adapter is included in the body of the connector. This facilitates the handling of the very small connector plugs. EMI (electromagnetic interference) protection is included in both the modular connector and adapter.

The adapter includes a floating sleeve to provide sufficient freedom to enable ferrule alignment. Ideally, the goal is to provide for a floating connection of the ferrules within the sleeve, with minimal if any ferrule rotation about the optical axis of each connector. Likewise, inclination (i.e. translation of the ferrule in the upward or downward direction relative to the optical axis) of the ferrule is to be minimized, since translation tends to make achieving an optimum connection between two mated ferrules more difficult. This is especially important for connectors using angle polished ferrules which can have ends polished to 8 degrees relative to the optical axis. The angled ends of the ferrules are the mating surfaces of the 2 connectors in face-to-face fashion. If the ferrules are allowed to rotate, or if excessive inclination of the ferrules is permitted, then the optimum connection between the connectors being joined will likely not be achieved. The prevention of ferrule rotation around the optical axis is also important for optimal tunability of the ferrules.

In the shuttered connector and adapter version of the invention, a modular connector shutter mechanism provides a spring-loaded, rotating door which automatically opens by rotating upward about a horizontal axis and then retracting so as to operably expose the ferrule, when the modular connector is inserted into the adapter. The shutter door slides toward the back of the connector housing into an open position. When the connector is removed from the adapter, the shutter compression spring expands and moves the shutter towards the front of the connector until it attains a closed position. While an example of a horizontally mounted connector shutter door is used herein for simplicity of explanation, other types of shutter doors or axes of rotation should be considered as being within the scope of the invention.

An adapter shutter mechanism in the modular connector version of the invention comprises an s-shaped spring acting upon the cams of shutter doors mounted to rotate about a vertical axis at each end of the adapter. Other types of springs and means for biasing the shutter doors into a normally closed position, such as spring clips, coil springs, torsion springs, elastic materials, etc. should be considered as being within the scope of this invention. When the adapter does not have a modular connector inserted in an open end, the s-spring pushes against the cam of the shutter door at the open end so as to urge it into the closed position. When the connector is pushed into the open end of the adapter, the connector shutter door retracts, so as to expose the ferrule plug, and the front of the connector pushes against the adapter door and overcomes the force of the s-spring on the adapter door so as to automatically move it into the open position. A latching mechanism is provided on the modular connector that keeps the modular contact and connector together. The latching mechanism is contained in the modular connector, facilitating its use with very small footprint systems. A mechanism to keep connector and adapter together is a push-push mechanism. The mentioned latching mechanism keeps universal modular contact and connector together.

A zero rotation embodiment of the modular contact and connector enables linear or curvilinear movement of the ferrule in 2 or 3 directions, but prevents undesired rotation, while minimizing undesired translation, of the ferrule— relative to the optic axis. The axes of upward and downward motion are shown herein as vertical and horizontal as well as orthogonal to each other solely for ease of explanation. However, other angles of upward and downward movement and/or non-orthogonal axes of motion should also be considered as being within the scope of the present invention.

The modular connector configuration is universal in that it can be used in virtually all possible configurations of single and multi-channel systems such as simplex, duplex, front panel, back plane, or middle plane systems.

The modular contact assembly comprises a ferrule plug with a longitudinal axis. The plug also includes a ceramic ferrule. A shell holds the ferrule plug and has one or more limiters. The plug and the shell are operably connected to each other so as to allow the ferrule to move axially along the longitudinal axis when in contact with another ferrule, while not allowing rotation of the ferrule about the longitudinal axis.

Spring loading of the ferrule is provided by a coil spring serving to bias the ferrule forward within the shell. The ferrule holder has a flange with at least one flat region about its periphery for engaging with limiters of the shell to prevent rotation of the ferrule about the longitudinal axis. A collar is also provided the ferrule holder to prevent rotation of the ferrule about the longitudinal axis.

Another embodiment of the invention includes an adapter body having at least two openings at its ends leading to the interior of the body which contains a barrel and an alignment sleeve within the barrel in a floating arrangement. Connectors can be inserted through the end openings and retained in aligned end-to-end contact with the ferrule of another connector. The push-push mechanism keeps connectors and adapters together.

Numerous other features and advantages of the present invention will become apparent from the following detailed description of the invention, the accompanying drawings and the appended claims.

BRIEF DESCRIPTION OF DRAWINGS

The design of the system can be better understood by following the description of the drawings set forth herein. A brief description of each figure is included here.

FIG. 3A is a perspective view of the modular connector including the contact of FIG. 1 and body contained within the shell and with the connector shutter in the closed position.

FIG. 3C is an exploded view of the modular connector showing the contact, shutter door, shutter door springs and housing.

FIG. 4B is a cross-sectional view of the modular connector containing the modular contact of FIG. 3B taken along its longitudinal axis and showing the shutter in an intermediate, open shutter position.

FIG. 7A is a longitudinal cross-sectional view of the modular connector/adapter system showing a modular connector fully inserted into one end of the adapter and the ferrule received within the alignment sleeve.

FIG. 8A is a perspective view of a second embodiment of the zero plug rotation embodiments providing for an additional degree of freedom.

FIG. 9 is a longitudinal cross-sectional view of the zero plug rotation modular contact embodiment of FIG. 8.

FIG. 9B is a longitudinal cross-sectional view of the zero plug rotation modular contact embodiment of FIG. 8 with the plug extender in its final position abutting the ferrule after the contact is terminated so as to insert the optic fiber through the plug extender and ferrule.

FIG. 10 is an inverted, transverse cross-sectional view of the zero plug rotation modular contact embodiment of FIG. 8 taken along section A-A of FIG. 9, inverted and viewed in the direction of the arrows, showing the modular contact.

FIG. 10A is a perspective view of the tuning tool showing the handle, metal insert and gripping end.

FIG. 17 (from a to f) is a schematic view which shows different positions of flipper 115 of the adapter and dual pin 112 of the connector during the push-push insertion and withdrawal action.

FIG. 18 is a perspective view of the simplified connector/adapter system 250 showing two universal modular contacts 251 contained and engaged within body 252.

DETAILED DESCRIPTION OF DRAWINGS

Figure 1:
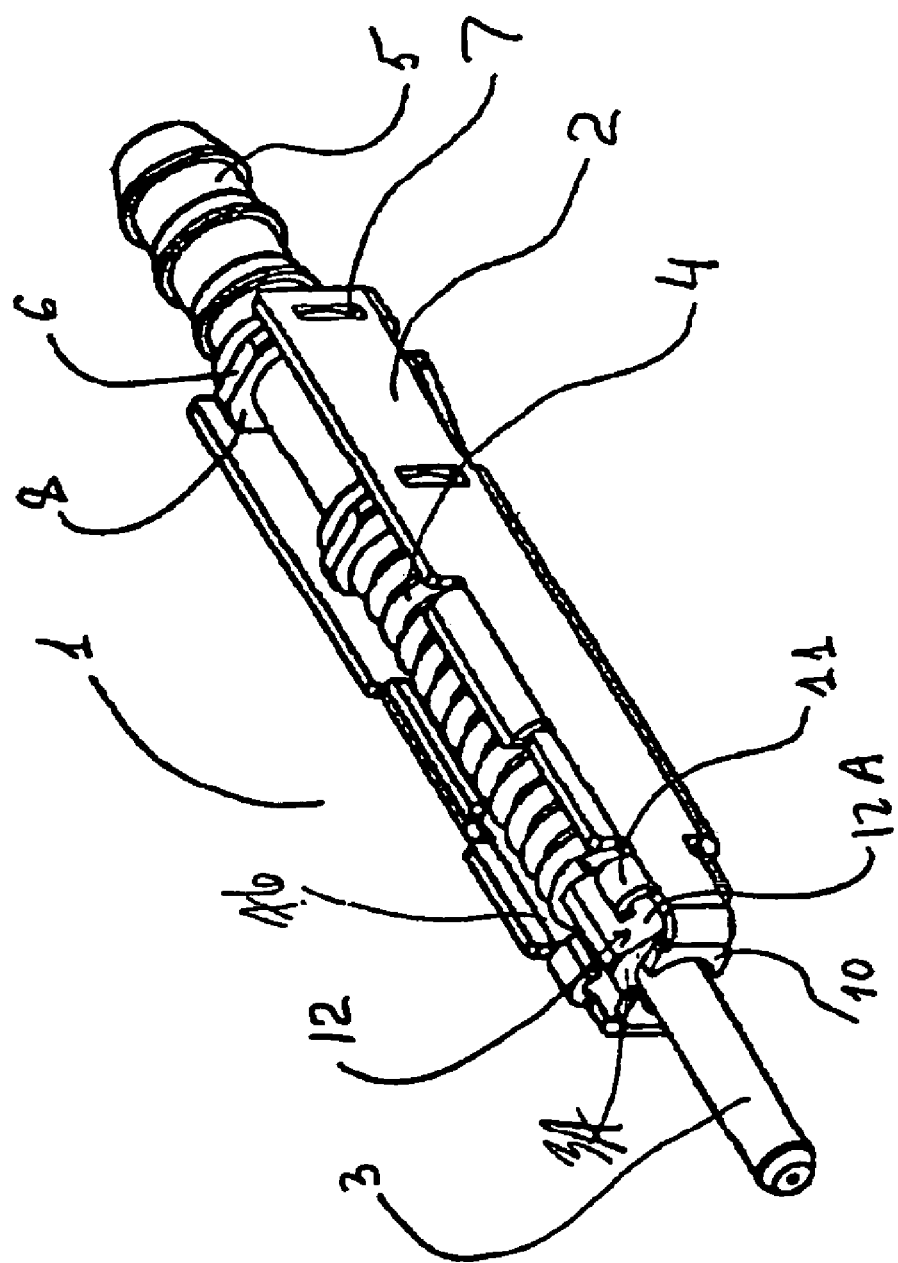
FIG. 1 shows an overall perspective view of the contact portion of the modular connector system of the present invention.

By way of disclosing a preferred embodiment, and not by way of limitation, FIG. 1 shows the modular contact assembly 1. Modular contact assembly can be used in either: the modular connector embodiment of FIGS. 3A-3C; the connector/adapter system embodiment of FIG. 7A; the push-push connector/adapter system embodiment of FIGS. 12-17F; and the simplified connector/adapter system body embodiment 250 of FIGS. 18-20 herein. This assembly of FIG. 1, has an outer shell 2 which serves as a holder for the ferrule plug comprising spring loaded ferrule 3 and ferrule holder 3A, spring 4, and rear nipple 5. In this embodiment shell 2 is made of metal, though use of other rigid materials should be contemplated as being within the scope of the invention.

Nipple 5 should be maintained steady in the position shown in FIG. 1, without rotation or axial movement thereof, for optimum performance. To prevent such undesired rotation and axial movement of nipple 5, a holder in the form of flats 6 are provided on flanges 8 of the nipple and slots 7 are provided on the outer shell. Flanges 8 protrude into slots 7, thereby preventing axial movement of nipple 5 relative to shell 2. Flats 6 contact flat bed 9 of the outer shell 2 (see FIG. 2), thereby further preventing rotation of nipple 5.

Ferrule 3 also should be prevented from rotating while being spring loaded in the idle position and while in the working position. To achieve spring loading of ferrule 3, two ears 10 are provided on the front end of the outer shell 2, as shown in FIG. 1. Spring 4, which in this embodiment is a coil spring, tends to bias ferrule 3 forward from the nipple 5 to the ears 10. To prevent rotation of ferrule 3, while allowing the axial movement of the ferrule 3 relative to shell 2, outer shell 2 is provided with four limiters 11 and ferrule holder 3A has a flange 12 with four flats. Other operative combinations of shell limiters 11 and numbers of flats on flange 12 should be considered as being within the scope of the invention. This configuration allows ferrule 3 to move axially, along its longitudinal axis, when in contact with another ferrule but does not allow ferrule 3 to rotate relative to the optical axis (shown in FIG. 9a).

For the purpose of enabling tuning of the ferrule, the described configuration allows ferrule 3 to be retracted by being pressed axially backward toward stationary nipple 5 (as viewed in FIG. 1) into the interior 76 of outer shell 2, so as to overcome the outward biasing force provided by compression spring 4. If ferrule 3 is pushed far enough axially backward so as to be disengaged from the limiters 11, ferrule 3 can be rotated (in this case in 90° increments to a total of four different positions) wherein different flats of flange 12 would be brought into contact with limiters 11, using a suitable tuning tool (shown in FIG. 10A).

Tunability is thereby provided by enabling ferrule 3 to be rotated in this example, to three different radial positions (beyond the original position) that could potentially provide a better end-to-end connection between the ferrules being connected. Similarly, if only three flats on flange 12 are provided on ferrule holder 3A, ferrule 3 can be retracted from engagement of flats 12 from limiters 11 and rotated in 120 degree increments to two other radial positions. After the tuning process is completed, ferrule 3 is released and pushed forward by the spring 4 to return to the working position with the front of flange 12 in contact with fingers 10.

Figure 2:
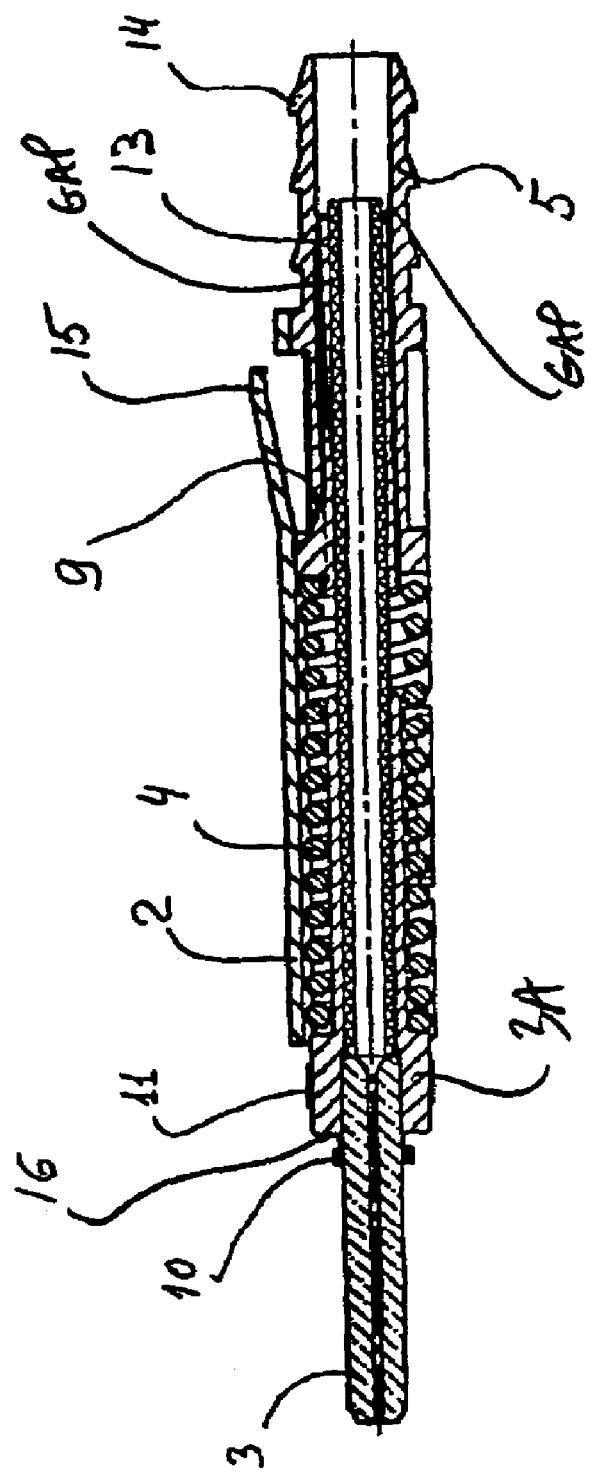
FIG. 2 is an inverted cross-sectional view of the contact of the modular connector shown in FIG. 1, taken along its longitudinal axis.

FIG. 2 is an inverted cross sectional view of the modular contact 1 with what is normally its bottom side shown on top. In addition to the foregoing, also shown is a plug extender 13 which is normally used to aid in injecting epoxy or any other appropriate glue into the interior of the central bore of ferrule 3 to fix the fiber in it. In the present invention, as will be described in more detail below, plug extender slides within the central bore of ferrule holder 3A from the extended position of FIG. 9A to the position of FIG. 2 which would be the final position of plug extender 13 after terminating contact 1 on to fiber optic cable (not shown in FIG. 2 but shown in FIG. 9B). Also shown in FIG. 2 on the nipple 5 are three circular teeth 14 which are used for enhancing crimping reliability, while terminating contact 1 onto fiber optical cable. Also shown in FIG. 2 is latch 15 which serves to secure modular contact 1 into modular connector 17 (as shown in FIGS. 3A and 3B).

FIG. 3A is a perspective view of the modular connector 17 with shutter 18 spring mounted on horizontal shaft 24 in a closed position. Modular connector 17 consists of the above-described modular contact 1, body 19, shutter 18 with the torsion spring 20 and compression spring 21 (see FIGS. 4A and 4B), outer shell 22 with the latch 23, shaft 24 for the shutter 18 (see FIGS. 4A and 4B), and releasing knob 25. Shutter 18 is normally biased into the closed position by torsion spring 20.

Figure 3B:
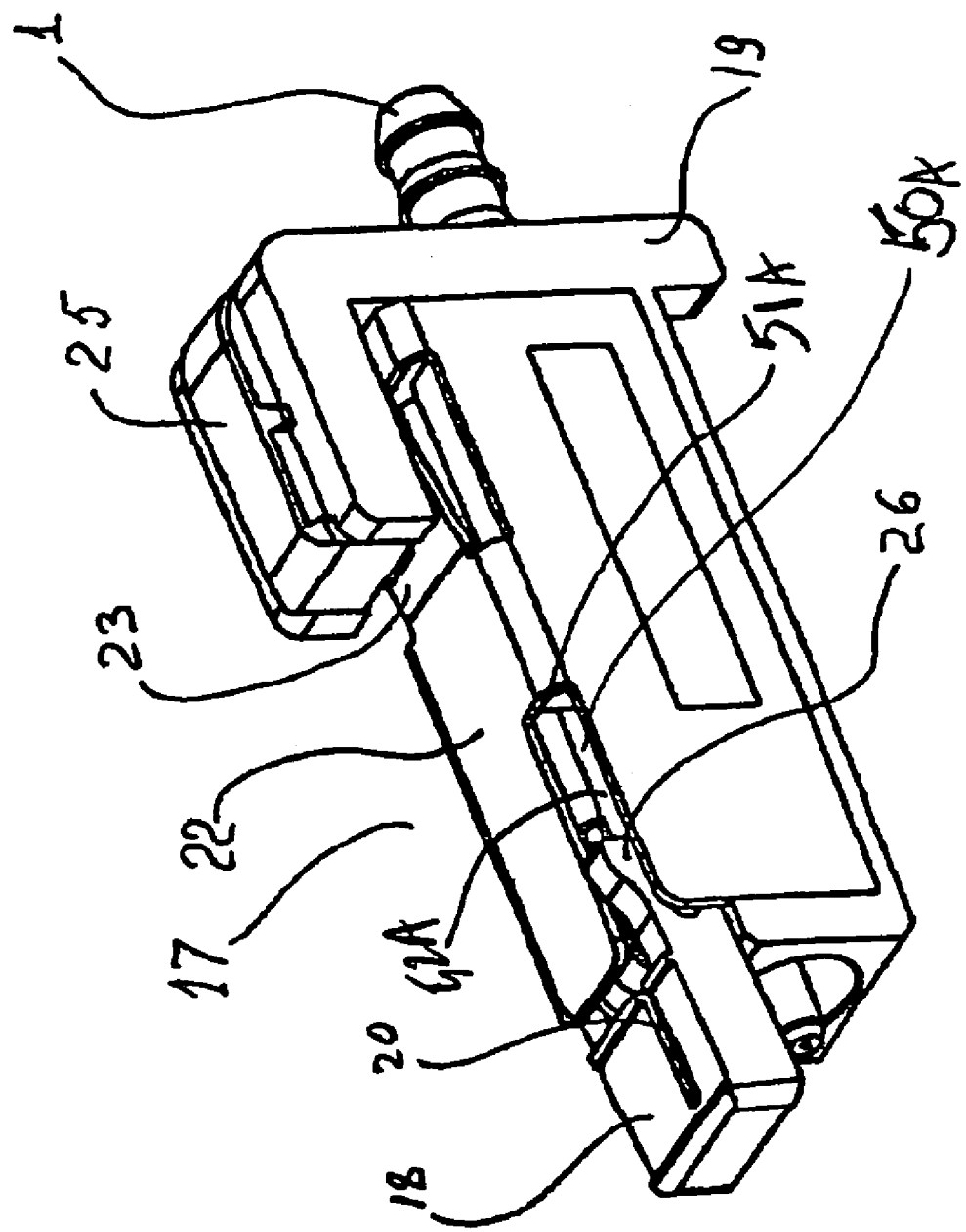
FIG. 3B is a perspective view of the modular connector including the contact of FIG. 1 and body contained within the shell and with the shutter in an intermediate open position.

FIG. 3B is a perspective view of modular connector 17 with shutter 18 in an intermediate open position. When modular connector 17 is introduced into one of the openings 29 of the adapter 28 (see FIG. 5), the shutter 18 hits the adapter entrance 29 by its asymmetrical prong 26 (see FIG. 3A) and rotates upward from the closed position of FIG. 3A into the intermediate, horizontal position shown in FIG. 3B. When modular connector 17 is pushed further forward into the opening 29 of adapter 28, then shutter 18 slides back into the body 19 with prong 26 protruding upwardly from and sliding along slot 50A (see FIG. 3B), thereby overcoming the spring force of spring 21 and compressing spring 21 until prong 26 is stopped by edge 51A of slot 50A in shell 22 (or shutter 18 is fully retracted within passage 52A of body 19) and connector 17 snaps into adapter 28 by its latch 23. As shutter 18 is pushed along passage 52A within interior of body 19, compression spring 21 resists until its outward spring force is overcome and spring 21 is compressed. Accordingly, spring 21 tends to bias shutter 18 outward into a non-retracted position towards the closed position. That way shutter 18 will tend to close automatically over ferrule 3 when modular connector 17 is withdrawn from engagement with adapter 28.

Figure 4A:
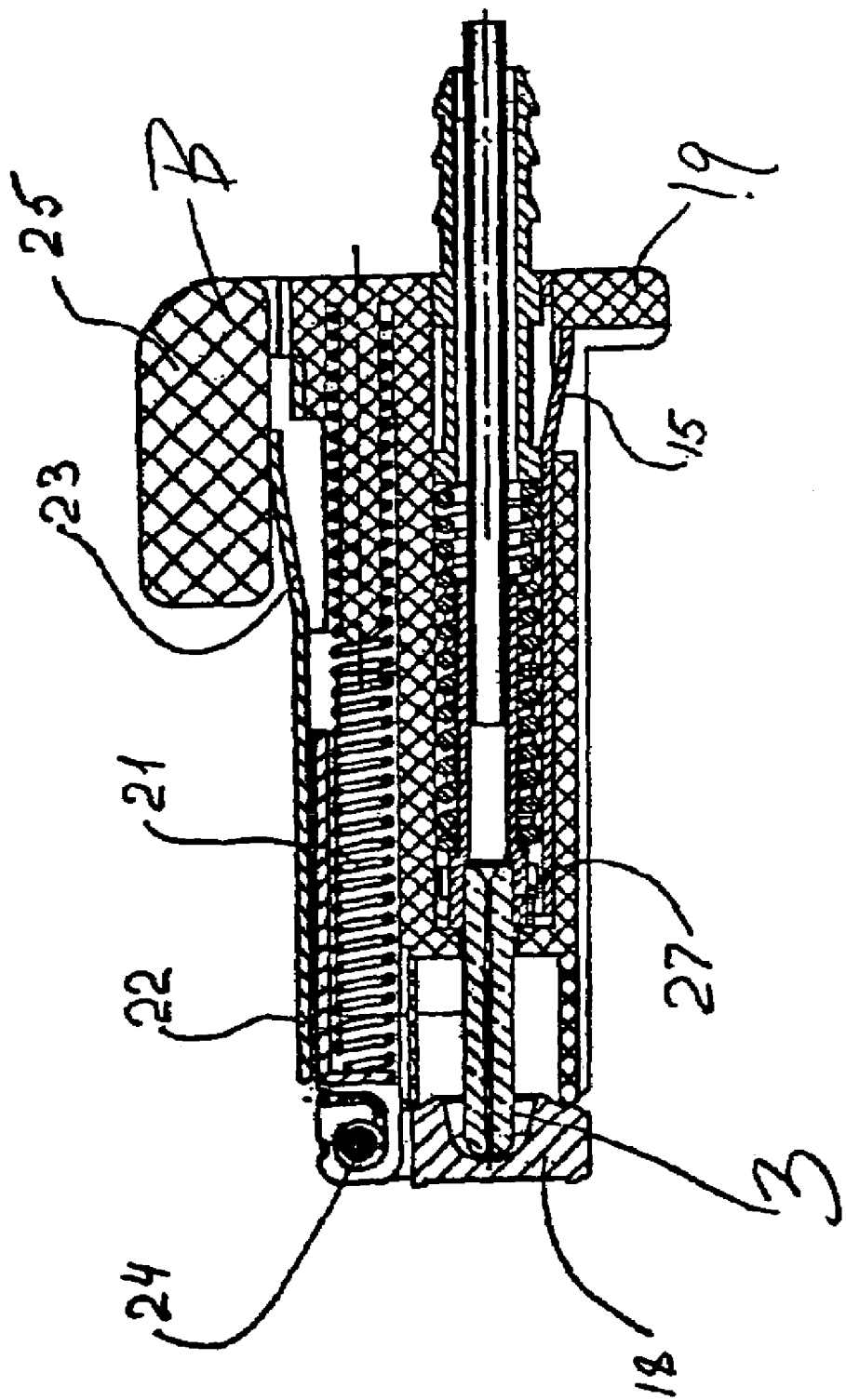
FIG. 4A is a cross-sectional view of the modular connector containing the modular contact of FIG. 3A taken along its longitudinal axis and showing the shutter in the closed position.

Conversely, retraction of shutter 18 opens access to the ferrule assembly 3 (see FIG. 1) so that ferrule assembly 3 can be engaged in operable physical end-to-end contact with an identical second modular connector (not shown) that is introduced into adapter 28 from the opposite side. This retraction process of shutter 18 is shown in FIG. 4B. In order to disengage modular connector 17 from the adapter 28, the knob 25 is pushed down, so that the latch 23 is prompted to lay substantially horizontally and connector 17 is thereby released from engagement with the adapter 28 and pushed slightly apart from the adapter 28, by two springs: 1) shutter compression spring 21 (see FIG. 4A); and, 2) compression spring 4 (see FIG. 1).

Compression spring 4 has four compressed positions: first, this spring is slightly compressed when assembled into the outer shell 2; second, this spring is compressed more when modular contact 1 is assembled into connector body 19 (ferrule 3 is spring loaded by contact of its end surface 16 against the fixed internal surface 27 of the body 19); third, compression spring 4 is compressed even more to the working level, when modular connector 17 is engaged in physical contact with identical connector (not shown) inside of the adapter 28; and, finally, compression spring 4 can be compressed almost to a solid state when ferrule 3 is pushed back during the tuning procedure.

FIG. 3C is an exploded view of modular connector 17. It shows modular contact 1 which is inserted into connector body 19 through opening 19A. Shutter door 18 is rotatably mounted on shaft 24 and biased downward by torsion spring 20 into a closed position. Shaft 24 is held by carriage 21A carrying compression spring 21 so as to bias shutter door 18 outward, as it retracts, spring 21 becomes compressed and shutter door 18 rotates upward to a horizontal position and moves linearly towards back end B of body 19. Prong 26 can then slide along slot 50A when shutter door 18 is in the horizontal position until it reaches end 51A. Knob 25 is positioned to depress latch 23 of shell 22.

FIG. 4A is a cross-sectional view of modular connector 17 with shutter 18 in the closed position. Compression spring 21 urges shutter 18 outward from end B of body 19. Torsion spring 20 urges shutter 18 radially downward about horizontally mounted shaft 24.

FIG. 4B is a cross-section view of the modular connector 17. It shows shutter 18 in an intermediate open position. In this position connector 17 would not yet be fully inserted into the adapter (not shown). Also it shows latch 15 which keeps modular contact 1 fully engaged and spring loaded in the body 19 of the modular connector 17. Free end 15A of latch 15 (see, FIG. 4B) contacts flange 15B to prevent modular contact 1 from being withdrawn from body 19. However, if latch 15 is pushed upward as viewed in FIG. 4B, it will clear the top of flange 15B and thereby enable retraction of modular contact 1 from body 19. It also shows latch 23 which can be pressed down by the knob 25 in order to disengage modular connector 17 from the adapter 28 when coupled (not shown).

Figure 5:
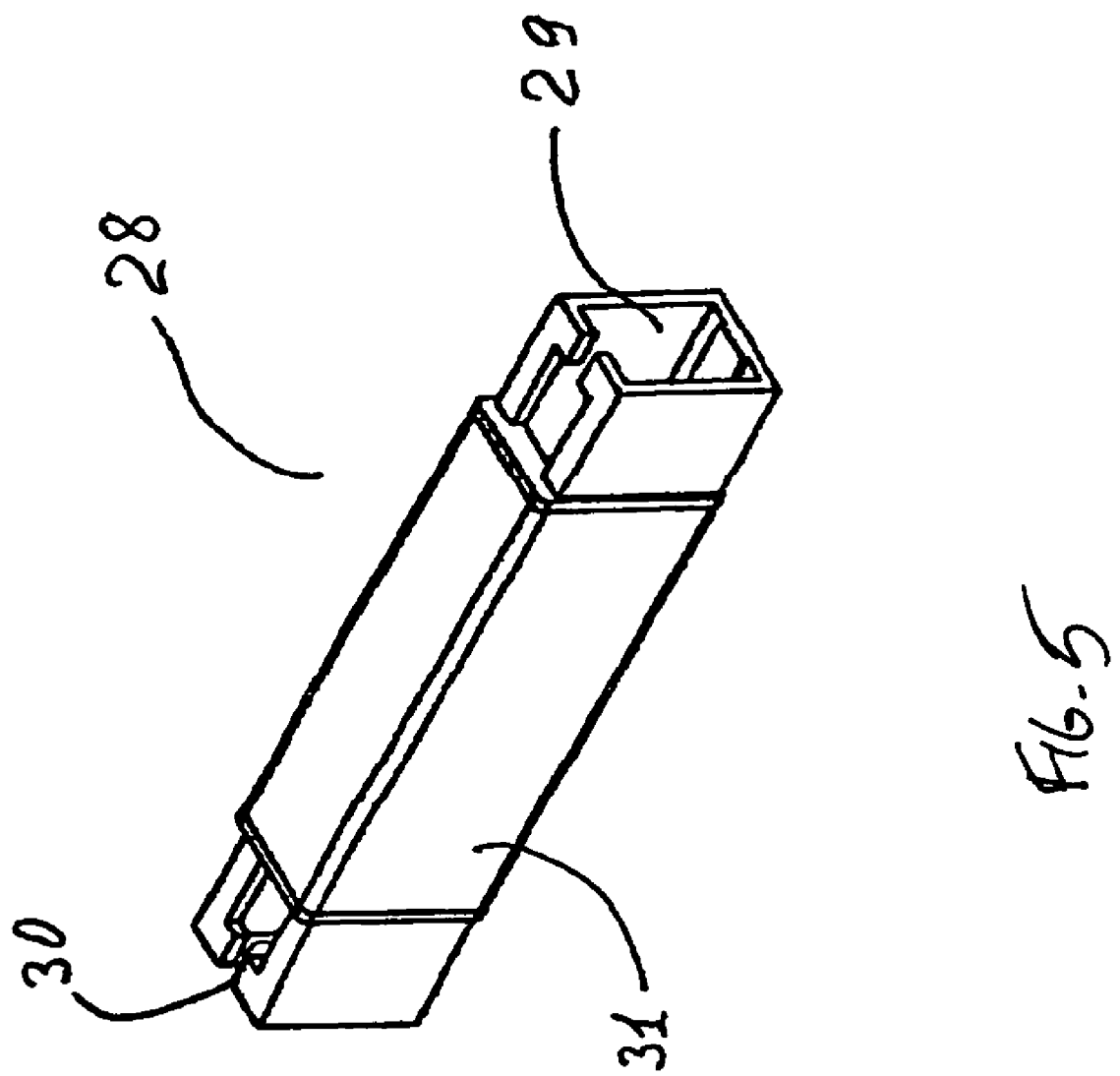
FIG. 5 is a perspective view of the adapter for the modular connector of FIG. 3 showing the openings at each end for receiving a modular connector in each opening.
Figure 6:
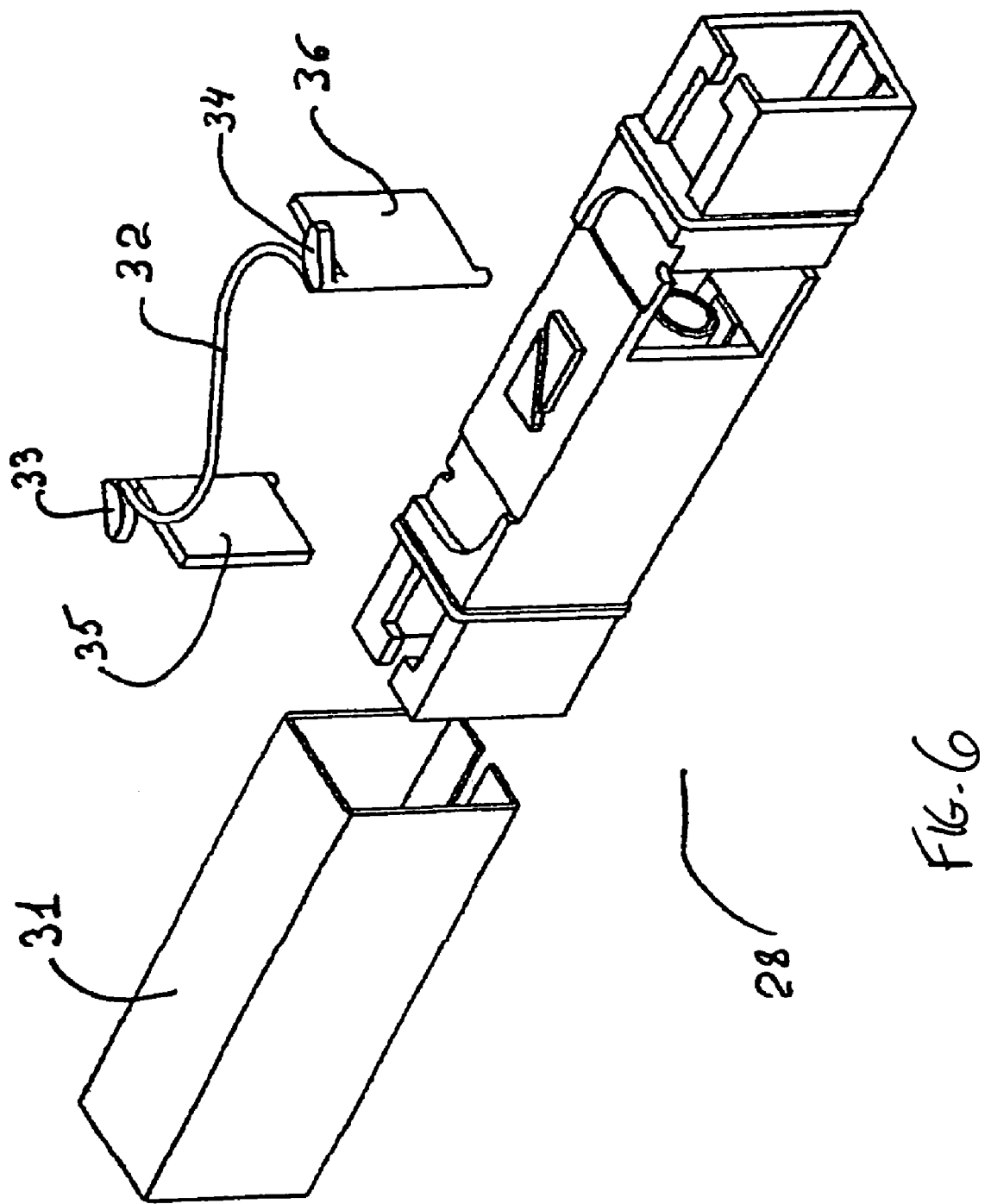
FIG. 6 is an exploded view of the adapter of FIG. 5 and the shutters with their respective cams and the s-spring normally contained therein. The shell is shown as removed. The shell serves to hold the various parts of the adapter together and provides EMI shielding.

FIG. 5 shows adapter 28 with two apertures 29 and 30 at its ends, where two modular connectors 17 (See, FIG. 3A) are intended to be inserted. It also shows outer shell 31 which serves as a holder and a cover of all the internal parts as well as an EMI shield. FIG. 6 shows adapter 28 in exploded view with shutters 35 and 36, outer shell 31 and spring 32 removed. It also shows the S-shaped spring 32 which outwardly biases two cams 33 and 34, each of which is respectively attached to ends of vertically mounted shutters 35 and 36 (see FIG. 7). Shutters 35 and 36, in this example each have a vertical axis of rotation. When modular connectors 17 are not inserted into the receiving apertures of the adapter 28, spring-biased cams 33 and 34 are pushed by spring 32 so that shutters 35 and 36 rotate into the closed position which is substantially transverse to the optical or longitudinal axis shown in FIG. 9.

Figure 7:
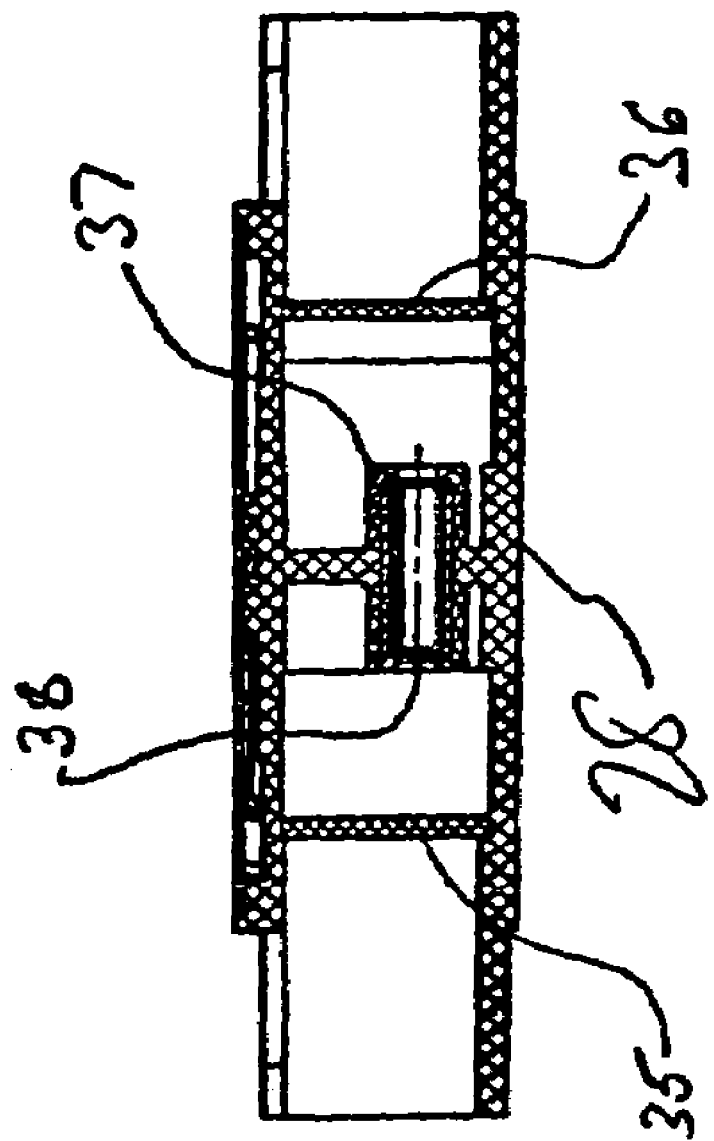
FIG. 7 is a cross-sectional view of the adapter shown in FIG. 5 taken along its longitudinal axis with both shutters in the closed position, and showing the barrel with the alignment sleeve inside.
Figure 20:
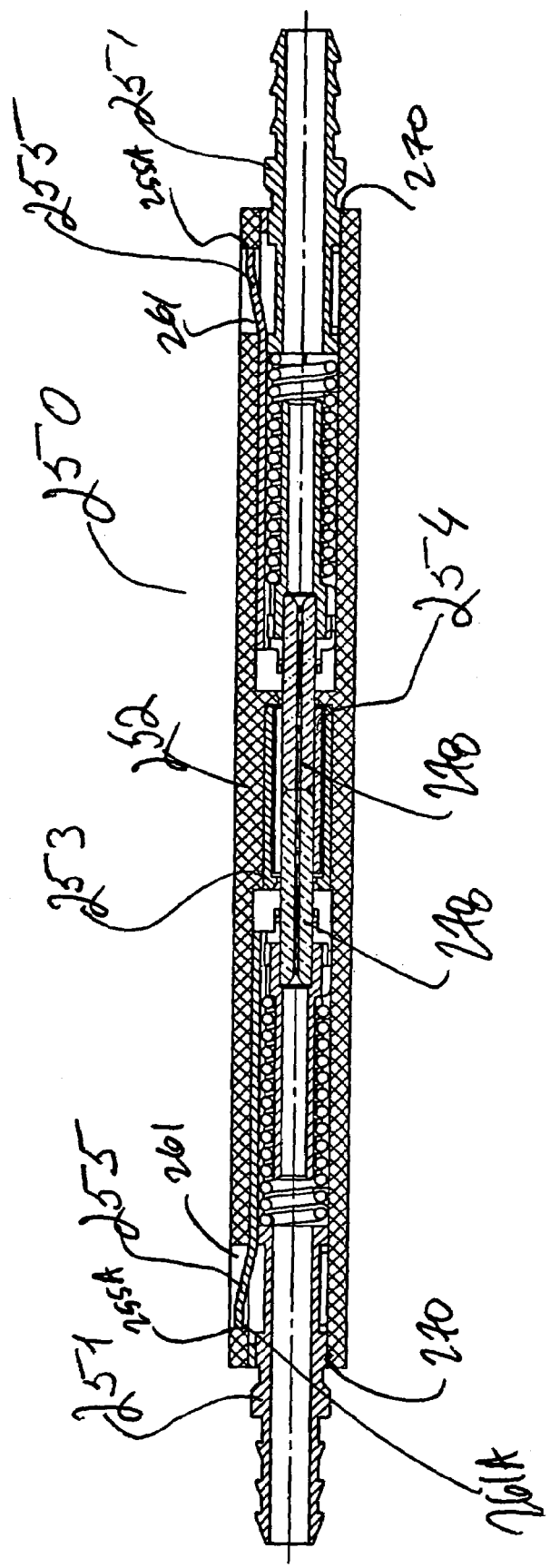
FIG. 20 is a longitudinal cross-sectional view of FIG. 18 showing the simplified connector/adapter system 250 with modular contacts 251 engaged within body 252.

FIG. 7 is a cross-sectional view of the adapter 28 of FIG. 5. It shows the two shutters 35 and 36 in closed position. It also shows barrel 37 with alignment sleeve 38 contained inside. Alignment sleeve 38 can to some extent freely float inside of the barrel 37, so it can optimally align two ferrules 3 (not shown) being engaged in physical, end-to-end contact from two opposite sides of the adapter. FIG. 20 shows two such ferrules in end-to-end contact within alignment sleeve 54 within barrel 53.

FIG. 7A is a longitudinal cross-section of the modular connector/adapter system, with modular connector 17 shown fully inserted into one end of the adapter 28. Ferrule 3 is received within alignment sleeve 38 floating within barrel 37 of adapter 28. When fully inserted, shutter 18 is fully retracted and spring 21 is fully compressed within passage 52A. Shutter door 35 of adapter 28 is shown closed because no modular connector has been inserted in end 30. Insertion of modular connector in opposite end 29 of adapter 28 has resulted in automatic retraction of shutter door 18 into passage 52A and opening of adapter shutter door 36 (not shown). Modular connector 17 has been latched to adapter 28 because latch 23 has been captured within chamber 23B and contacts end wall 23A of chamber 23B—thereby preventing withdrawal of connector 17 from adapter 28. To release modular connector 17 from adapter 28, knob 25 is pushed downward (when viewed in FIG. 7A) sufficiently to enable latch 23 to clear the bottom surface of endwall 23A. The connector 17 can then be pulled to the right (as viewed in FIG. 7A) and removed from engagement with adapter 28.

Figure 8:
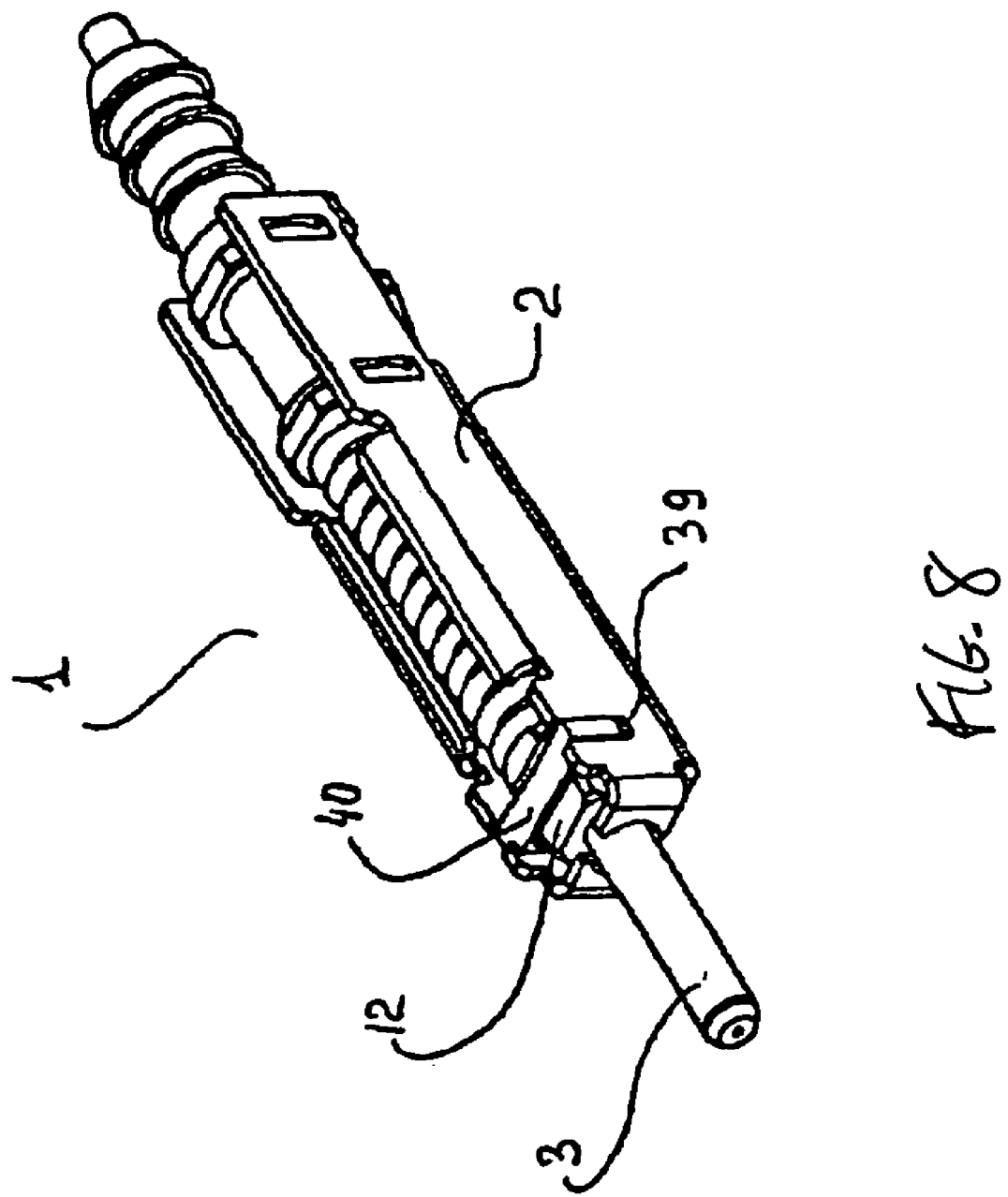
FIG. 8 is a perspective view of the zero plug rotation embodiment of the modular contact intended for use particularly in angled physical contact ("APC") environments.

FIG. 8 shows another embodiment of the modular contact assembly 1. This embodiment is well suited for the APC ("angled physical contact") version of the universal modular contact. In an APC environment, since the mating ferrules are polished at a certain specified angle relative to the optical axis, axial rotation of the ferrules about the optical axis is especially to be avoided to the extent possible.

At the same time floating of the ferrule in planes perpendicular to the optical axis ("X" and "Y" planes) is enabled for conventionally polished ferrules. In order to achieve movement in the X and Y planes (shown in FIG. 10) resulting in such linear or curvilinear movement, the modular contact assembly 1 shown in FIG. 8 has differences as compared to the same assembly shown in FIG. 1. This assembly has similar outer metal shell 2 with two slots 39. Insert 40, as shown in FIG. 10, can move freely in those slots in the Y (vertical) direction limited by the internal aperture of the connector body 19 (see FIG. 3). The square flange 12 of the ferrule 3 can move freely in the X (horizontal) direction inside of the rectangular aperture 41 of the insert 40 shown in FIG. 10. The rest of the universal modular contact 1 is comparable to the contact shown and described with respect to FIG. 1.

FIG. 8a shows another embodiment of the universal modular contact with zero plug rotation. Insert 49 has two pins 50 on the opposite sides. Those pins can move up and down in the slots 39 (Y direction as viewed in FIG. 10). At the same time insert 49 can slightly rotate around the axis of the pins 50. It gives ferrule 3 one more degree of freedom, but still maintains zero plug rotation around the optical axis (see FIG. 9).

FIG. 9 shows insert 40 and flange 12 of the ferrule 3 in the intermediate position so that it can slightly move up or down in Y (vertical) direction.

Figure 9A:
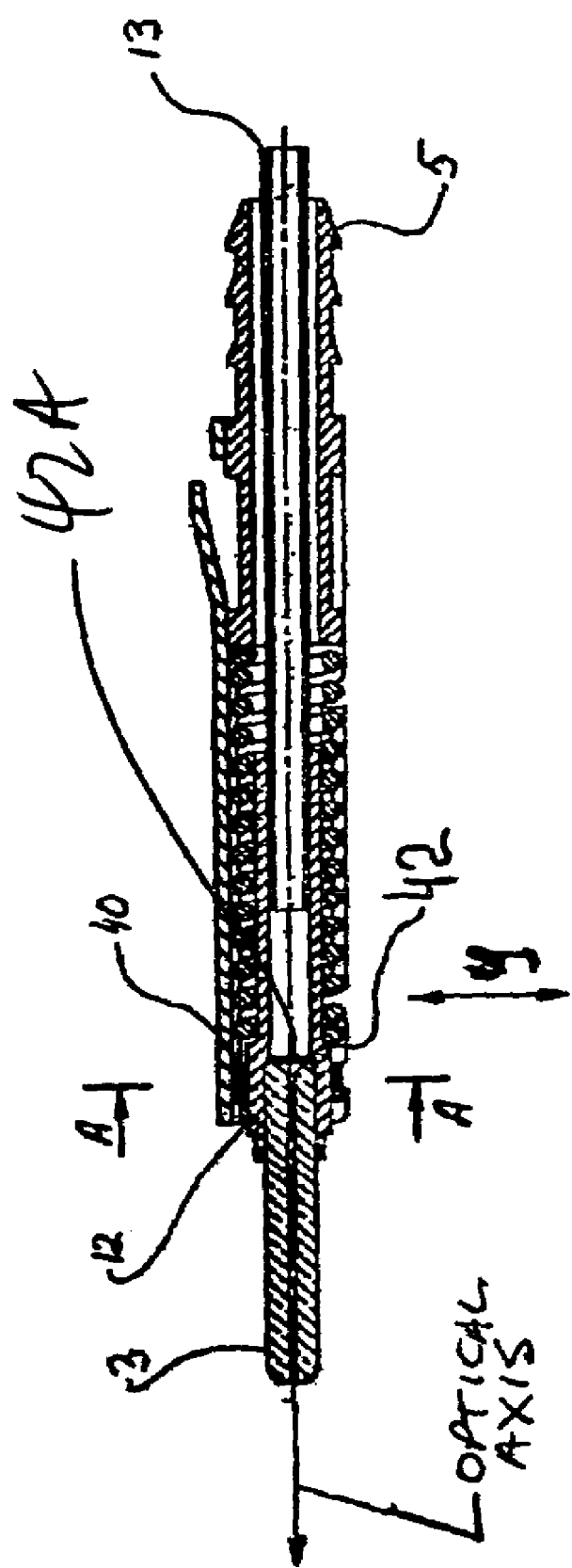
FIG. 9A is a longitudinal cross-sectional view of the zero plug rotation modular contact embodiment of FIG. 8 with the plug extender in its initial position extending out beyond the nipple, before finishing and insertion of the optic fiber.

FIG. 9A shows plug extender 13 (see also FIG. 2) only partially inserted into metal holder 42 of the ferrule 3. This is an intermediate position which changes when universal modular contact 1 is terminated onto the cable 48 (see FIG. 9b). Hence, extender 13 slides within contact 1 until it reaches the stop 42A created by the end of ferrule 3 so that the fragile junction between fiber 44 and plug extender 13 is not exposed outside of the plug body.

FIG. 9b shows the universal modular contact 1 terminated onto the cable 48. It also shows the plug extender 13 fully inserted into the ferrule holder 42 up to stop 42A. In addition, buffer 43 touches the end 13A of the plug extender 13 so that fiber 44 is not exposed in an unsupported position which would be prone to breakage. Furthermore it shows the crimping tubing 45 which holds Kevlar® liner 46 and jacket 47 relatively immovable relative to the nipple 5.

FIG. 10 shows an inverted section A-A of the universal contact shown on FIG. 9. In this section, insert 40 is shown in the intermediate position inside of two slots 39 of the outer shell 2. Insert 40 can move in Y direction (in this case, vertical direction) for the distance+/− Y and consequently drag ferrule 3 by its flange 12 in the same direction and distance. Flange 12 of the ferrule 3 can also move inside of the rectangular aperture of the insert 40 in X direction for the distance+/− X. Thus, ferrule 3 can move in both the X and Y directions while not being allowed to rotate around the optical axis (see FIG. 9).

FIG. 10A shows the tuning tool comprising handle 70 and metal insert 71 with gripping end 72 for grabbing, pushing and turning the ferrule. The present invention enables the use of ultra-small, sub-millimeter ferrule diameters that decrease the system size.

Figure 11:
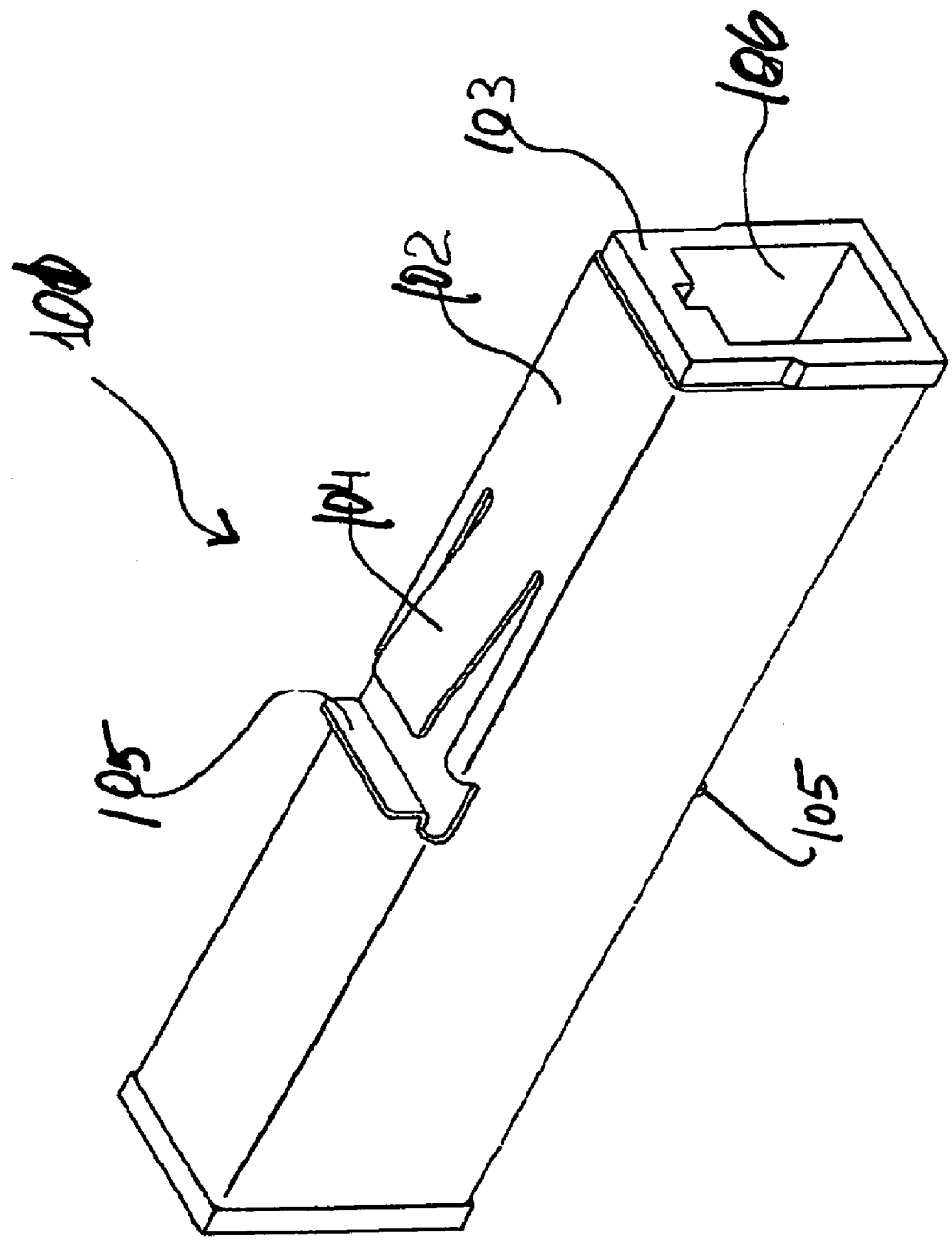
FIG. 11 shows an overall perspective view of the miniature adapter of the push-push embodiment of the invention.

FIG. 11 shows the miniature "push-push" version of adapter 101. This adapter has an outer shell 102 which serves as a holder for the adapter housing 103 comprising two push-push insertion-withdrawal mechanisms (see FIG. 14) and has latch 104, two stoppers 105, and two apertures 106 (only one is shown) for two connectors 107 (see FIG. 14). In this embodiment, outer shell 102 is made of metal, though use of other rigid materials is contemplated as being within the scope of the invention. Housing 103 is made from plastic though use of other rigid materials (including cast metal) is contemplated as being within the scope of the invention.

Figure 12:
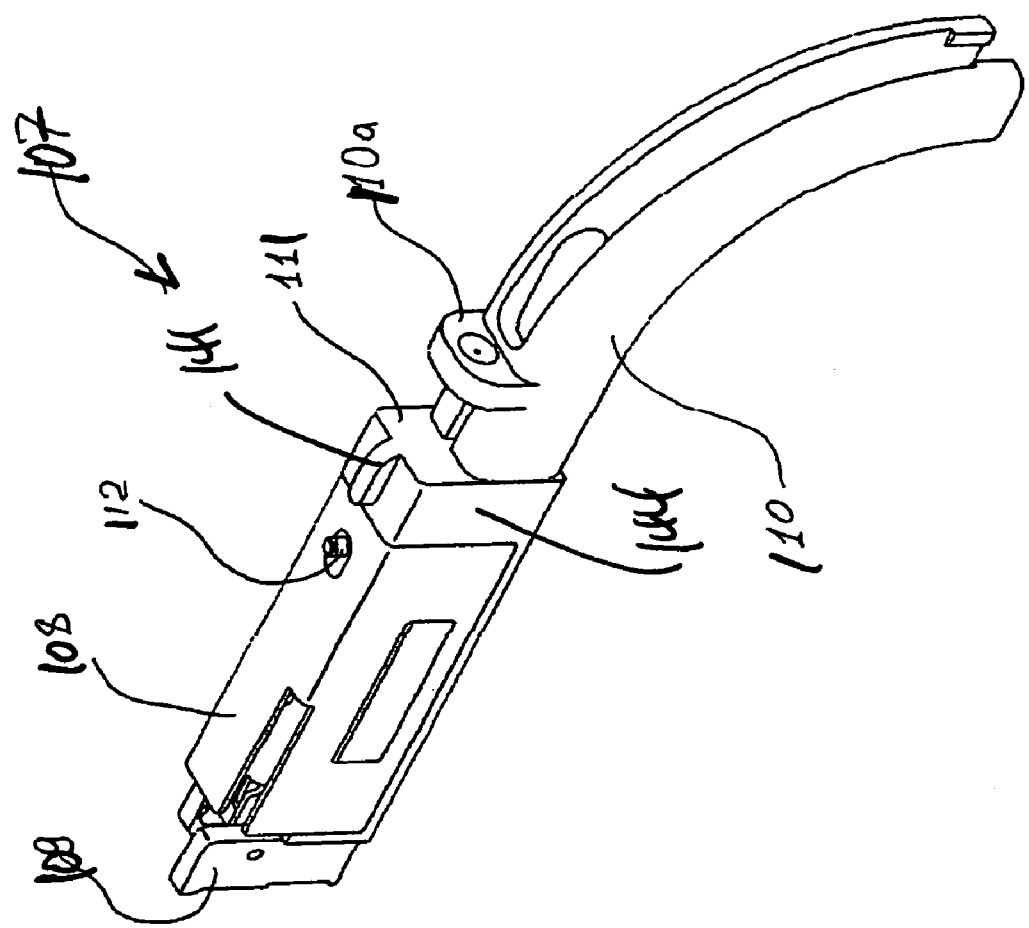
FIG. 12 shows an overall perspective view of the miniature connector with its shutter in the closed position.

FIG. 12 shows miniature connector 107 for use with the "push-push" adapter shown on FIG. 11. This connector has an outer shell 108, front shutter 109, boot 110 for fiber optic cable (not shown), connector housing 111, and a dual pin 112 for interaction with the push-push mechanism of adapter 101 (see FIG. 11). In this embodiment, outer shell 108 is made of metal, though use of other rigid materials is contemplated as being within the scope of the invention. Housing 111 is made from plastic though use of other rigid materials (including cast metal) is contemplated as being within the scope of the invention. Boot 110 is made from substantially rigid plastic, though use of other rigid material (including hard durometer rubber) is contemplated as being within the scope of the invention. Boot 110 has a tab 110a which can be pressed to actuate the push-push interconnection mechanism with a suitable stylus-like member such as the tip of a pen, a PDA stylus, the end of a paperclip or the like in order to engage connector 107 with adapter 101. Dual pin 112 has an upper portion that is substantially circular in cross-section (FIG. 14) and a lower portion substantially square in cross-section (FIG. 17).

Figure 13:
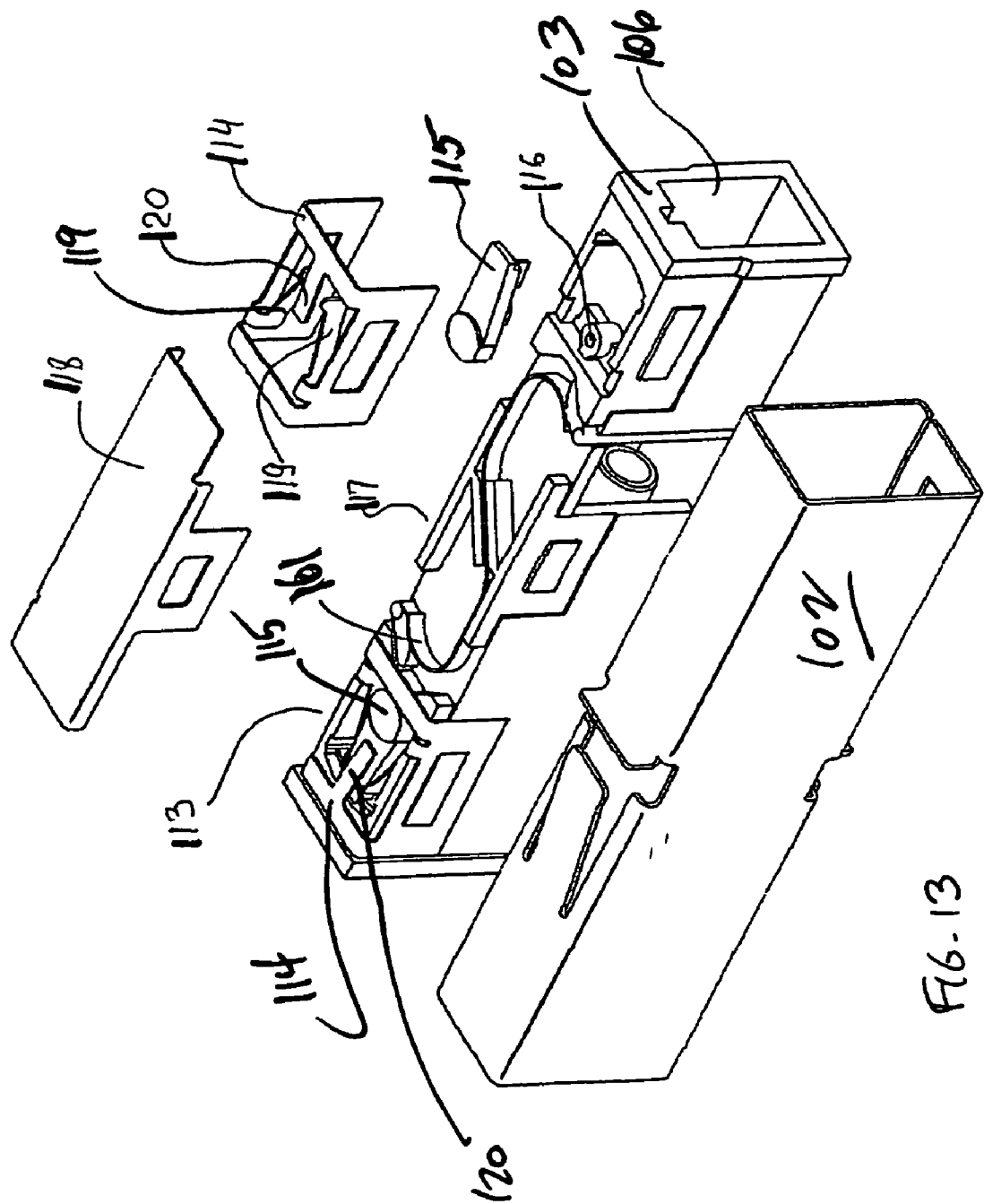
FIG. 13 is a partially exploded view of the miniature adapter including both push-push mechanisms and both shutters.

FIG. 13 shows a partially exploded view of miniature push-push adapter 101 (see FIG. 11). In this view, two push-push mechanisms 113 are shown near each of the apertures 106. Each mechanism 113 consists of triple prong spring clip 114, flipper 115, and nest 116 which serves as a vertical axis about which the flipper 115 rotates or pivots. Also shown in FIG. 13 are dual shutter mechanism 117 and its cover 118. FIG. 13 further shows adapter 101 in partially exploded view. It also shows the S-shaped spring 161 which outwardly biases two cams (not shown), each of which is respectively attached to ends of vertically mounted internal shutters (not shown). Shutters in this example each have a vertical axis of rotation. When connectors 17 are not inserted into the receiving apertures 106 of the adapter 101, spring-biased cams (not shown) are pushed by spring 161 and rotate so that the internal shutters are in the closed position.

Adapter also contains a barrel containing an alignment sleeve (not shown in FIG. 13). Alignment sleeve can to some extent freely float inside of the barrel, so it can optimally align two ferrules (not shown in FIG. 13) being engaged in physical, end-to-end contact from two opposite sides of the adapter 101. Such end-to-end contact of the ferrules is shown in FIG. 20.

It should be understood that dual pin 112 (shown on FIGS. 12 and 14) is an integral part of the push-push mechanism, since this dual pin 112 serves as an actuator of the mechanism. Each triple prong spring clip 114 has two side arms 119 that keep flipper 115 in the middle position in line with the longitudinal axis of the adapter when push-push mechanism is not actuated. Triple prong spring clip 114 also has a horizontally positioned arm 120 that presses flipper 115 down in order to maintain its constant contact with dual pin 112 (see FIG. 13) while performing push-push action during insertion and withdrawal of connector 107 in or out with respect to the adapter 101.

Figure 14:
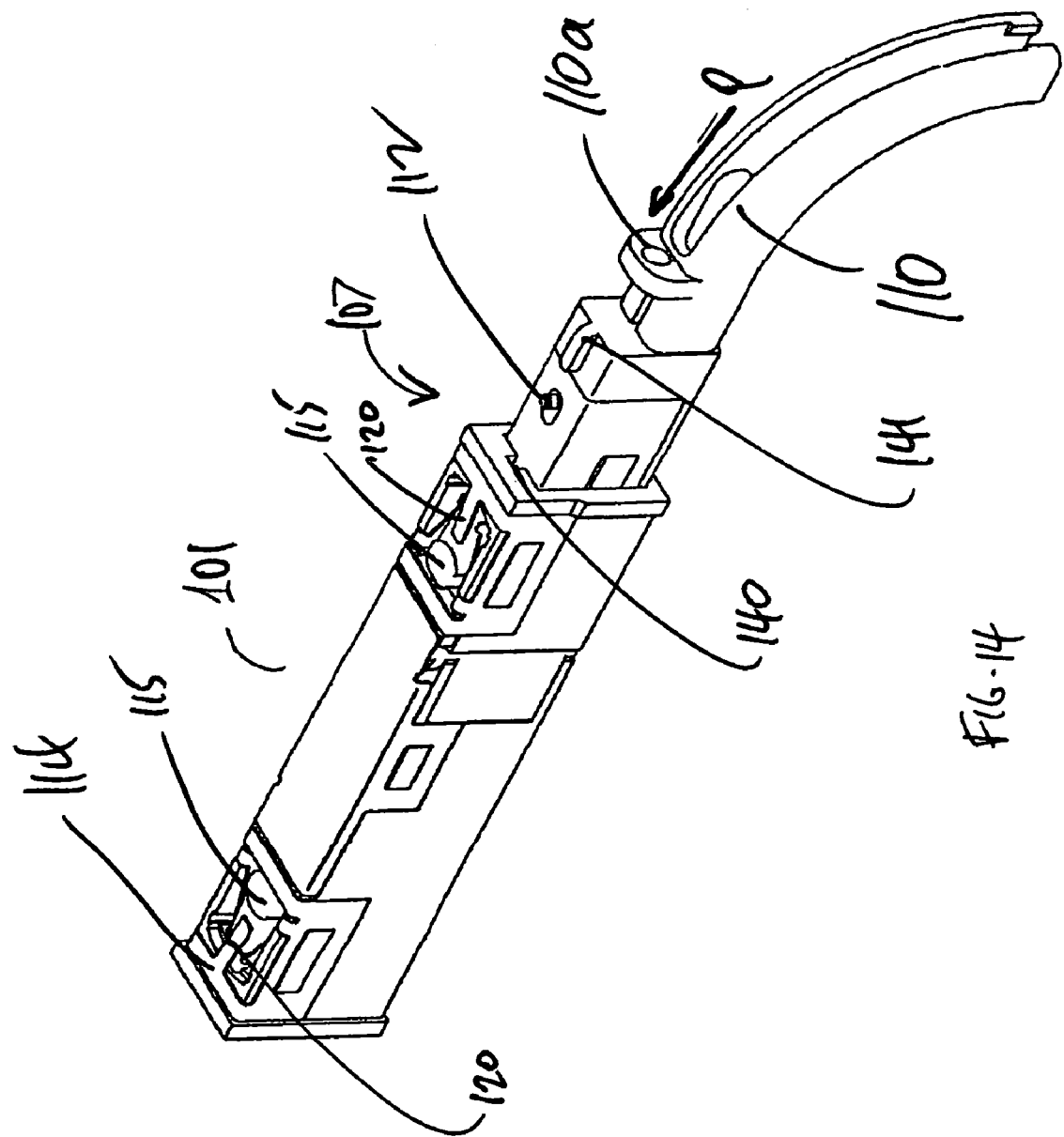
FIG. 14 shows an overall perspective view of the miniature connector partially inserted into the miniature adapter (the adapter shell 118 is removed).

FIG. 14 shows connector 107 partially inserted into adapter 101, as shown in FIG. 14, the omission of cover 102 exposes spring clips 114 having side arms 119, which serve to keep flippers 115 in the middle position, as shown in FIG. 14, until connector 107 is inserted far enough into adapter 101 that flipper 115 captures the square portion of pin 112 so as to retain connector 107 therewithin in engaged relation with adapter 101.

The insertion of connector 107 into this engaged and retained relationship with adapter 101 can be accomplished by applying force P, as shown in FIG. 14, to tab 110A by using a stylus, pen point, paper clip end or the like. Notch 140 provides clearance for pin 112 and enables proper alignment by receiving and accommodating detent 141 as it moves into the interior 106 of adapter 101.

FIG. 14 thus shows a perspective view of connector 107 initially, but not fully inserted into adapter 101 (outer shell not shown). This position is the beginning of the push-push process of securing the connector 107 in the mating position within the interior 106 of adapter 101.

Figure 14A:
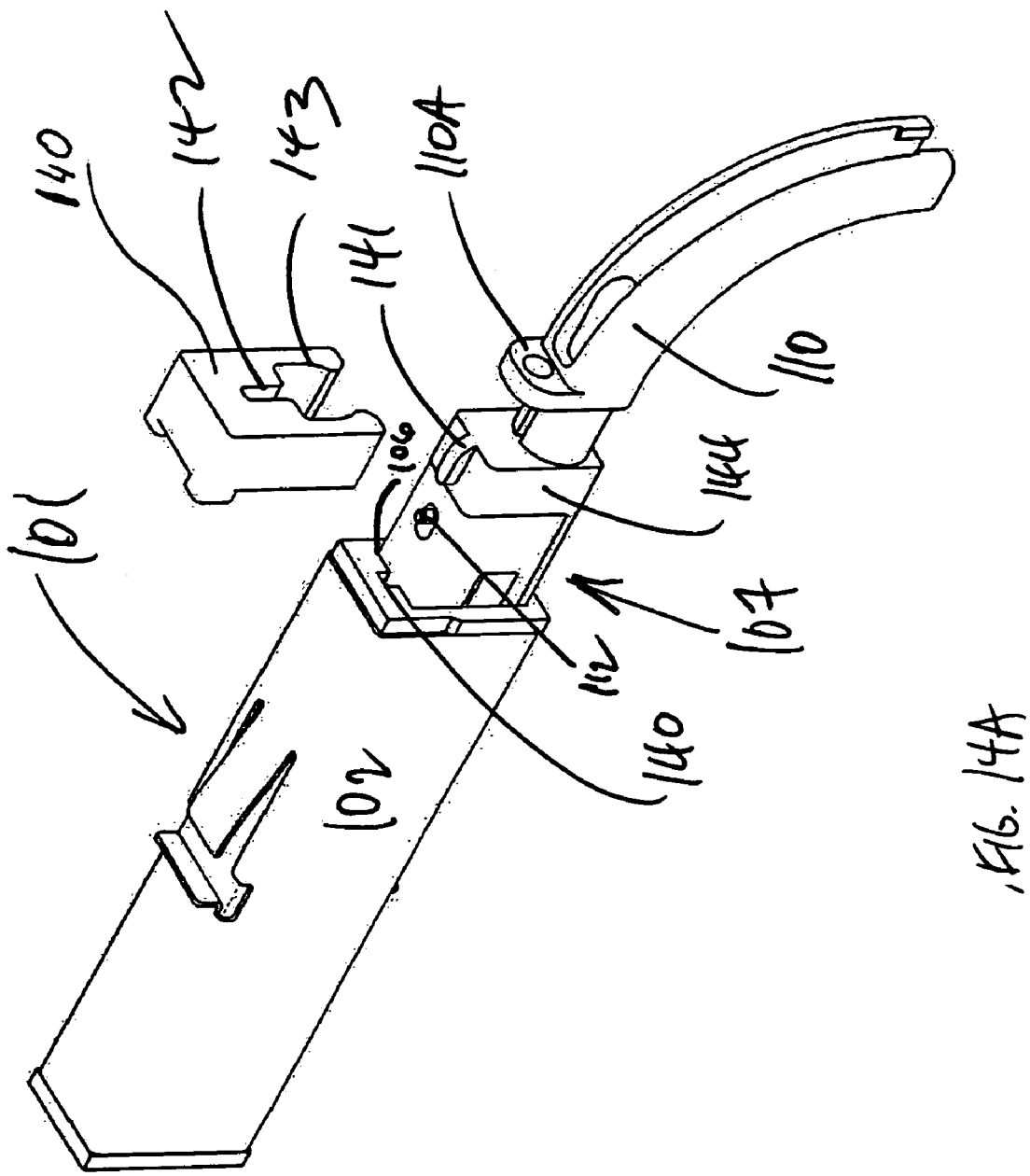
FIG. 14A is an overall perspective view of the miniature adapter with locking spacer 140 prior to engagement with the connector.

As shown in FIG. 14A, connector 107 is inserted partially (not fully) into opening 106 of one end of adapter 101. It is not inserted far enough for pin 112 to activate the engagement/disengagement mechanism within interior 106 of adapter 101. To prevent unintentional activation of the engagement/disengagement mechanism, spacer clip 140 can be inserted between connector 107 and adapter 101 so that notch 142 and cutout region 143 of spacer clip 140 engage connector 107 by receiving detent 141 and body 144, respectively. That way, because spacer clip 140 prevents connector 107 from being pushed into interior 106 of adapter 101, unintentional engagement and disengagement of connector 107 and adapter 101 is prevented. To prevent losing spacer clip 140, it should be loosely attached to connector 107 by wire, rubber band, string, rope, lanyard, filament, Velcro®, or the like (not shown) so that it is readily available when needed, without interfering with its locking function. Likewise, mating fasteners could be used to so attach spacer clip to the connector when not in use to prevent loss.

Figure 15:
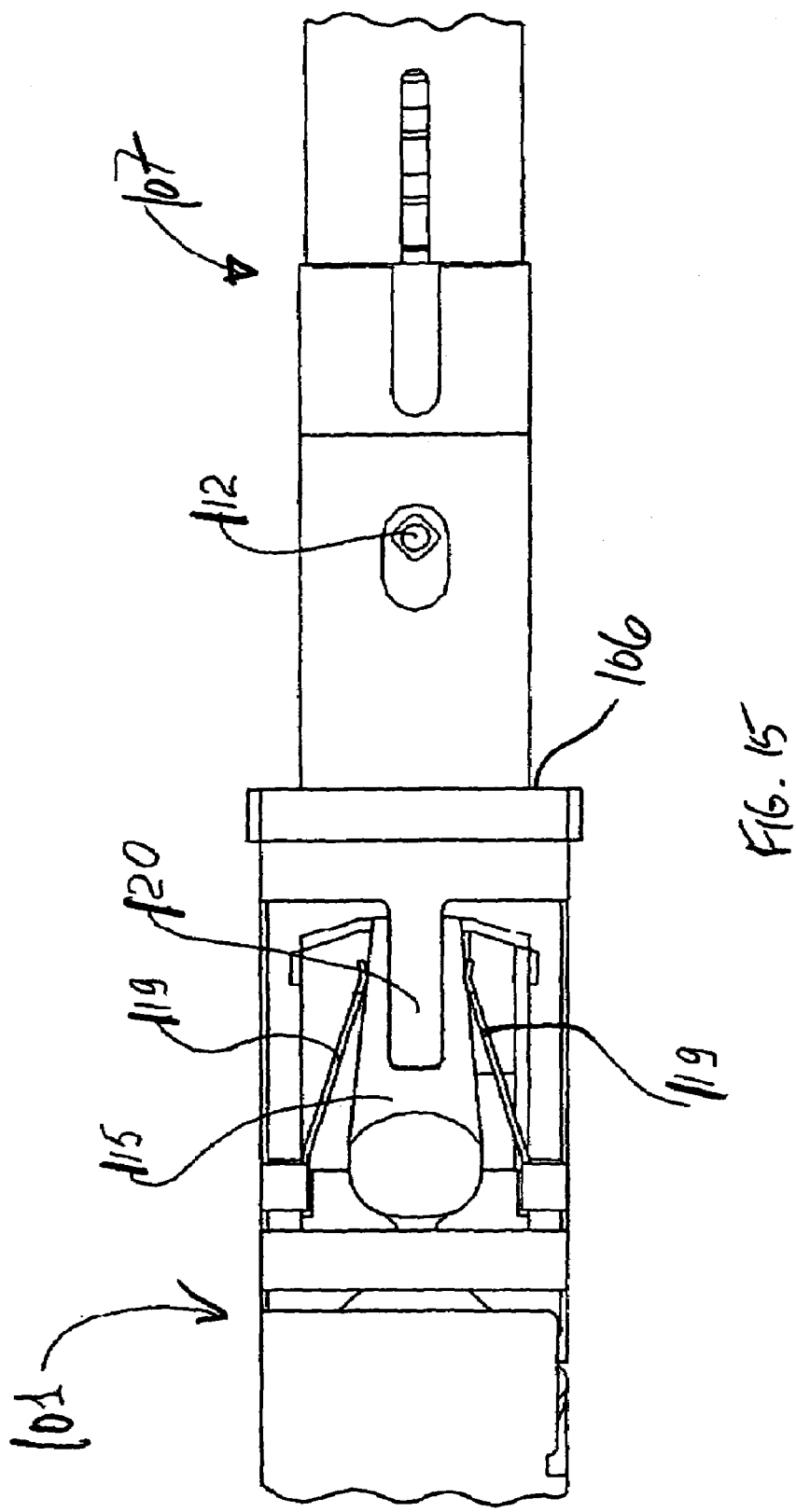
FIG. 15 is a top view of the miniature adapter and miniature connector when connector 107 is partially inserted into adapter 101 and the adapter shell 118 is removed.

FIG. 15 shows an enlarged top view of the connector 107 in the process of being inserted into the interior of adapter 101. Dual pin 112 has not yet entered adapter interior 106. Side prongs 119 are in symmetrical position that keeps flipper 115 substantially in line with the longitudinal axis of the connector/adapter combination. Horizontal prong 120 presses flipper 115 down. This position is schematically shown on the FIG. 17a.

Figure 16A:
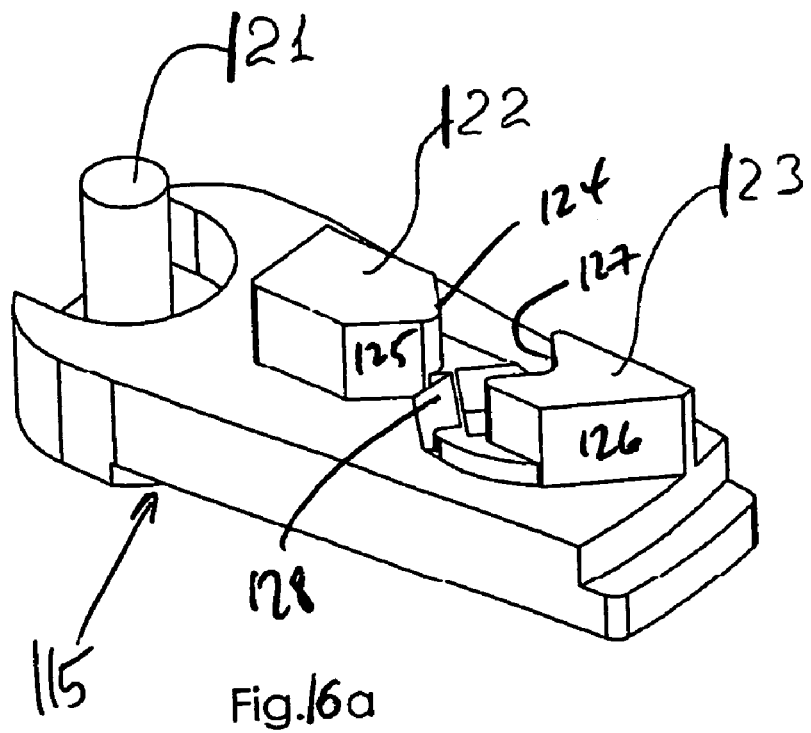
FIG. 16A is an isometric view and FIG. 16B is a bottom view of flipper 115 (see FIG. 13 and FIG. 15).
Figure 16B:
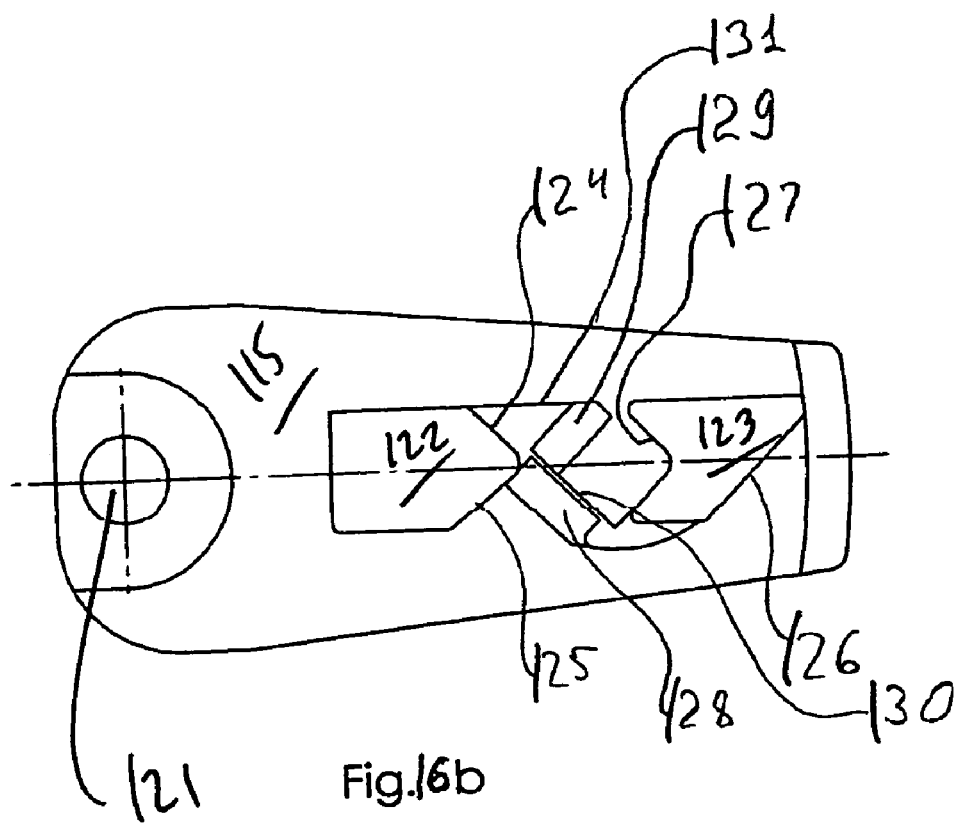
Figure 16:
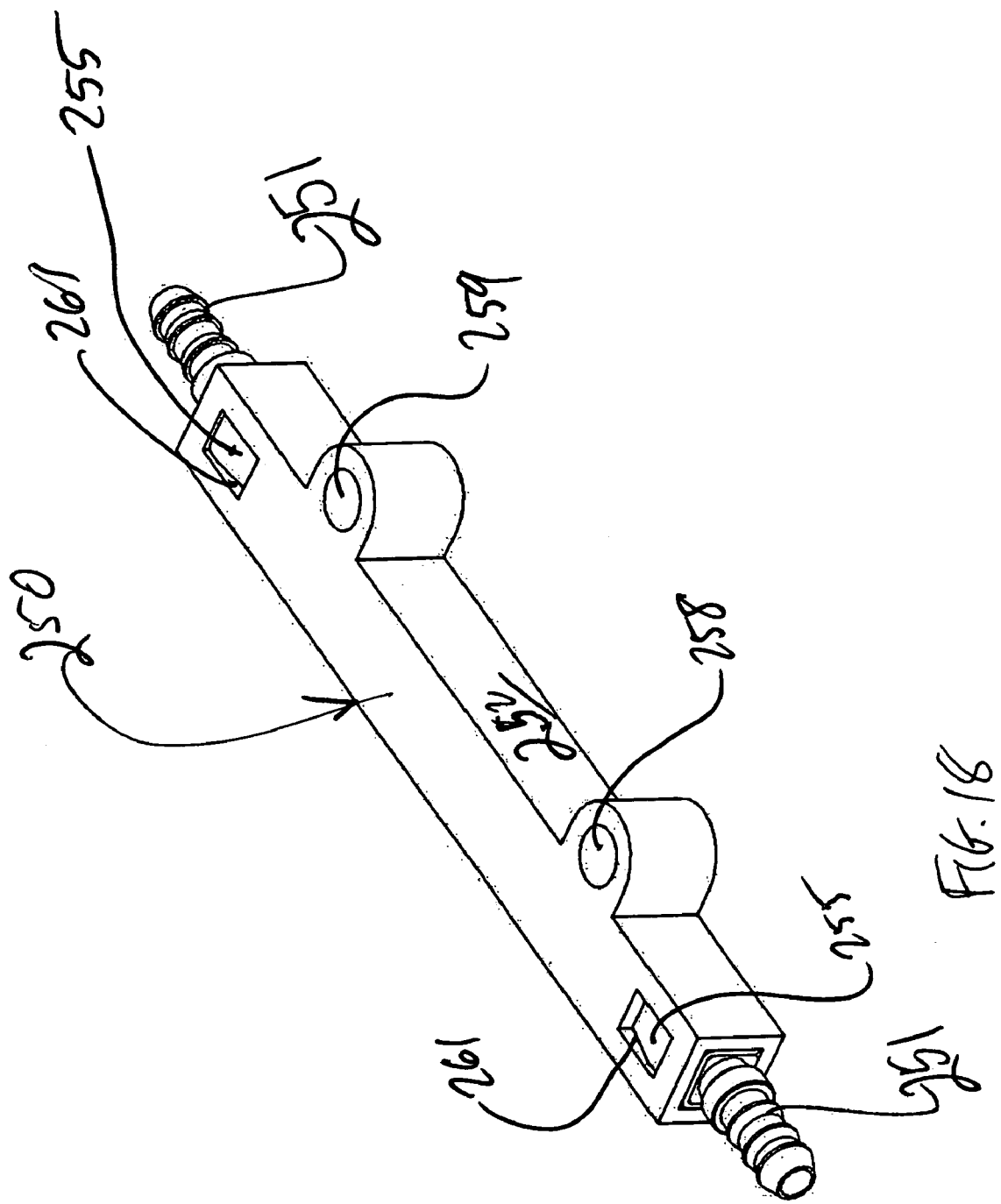

FIG. 16 shows flipper 115 in detail. FIG. 16a is an isometric view of the bottom surface of the flipper 115. FIG. 16b is a bottom view of the flipper 15. FIGS. 16a and 16b show that flipper 115 includes pin 121 providing a vertical axis about which flipper 115 swings or pivots to the left and to the right during the push-push operation. Also shown are inclined cam surfaces 124 and 125 of projection 122 and inclined cam surface 126 of projection 123 which urge flipper 115 to swing to the left or to the right based on direct contact with dual pin 112 of the connector 107, depending upon whether dual pin 112 (see FIG. 14) moves forward or backward respectively, during either the insertion or withdrawal operation.

As further shown in FIG. 17d, V-grooved surface 127 of projection 123 reliably keeps connector 107 in its mating position by holding squared portion of dual pin 112 with the force of the internal connector spring (not shown). Cams 128 and 129 facilitate flipper 115 to move over the ramped edges 130 and 131 while the non-ramped opposite vertical sides of those edges 130 and 131 prevent flipper 115 from sliding back and swinging in the wrong direction during insertion or withdrawal of connector 107 into or from adapter 101. As pushing force $P_{P1}$ continues to move left in FIG. 17b until it reaches face 125 of projection 122 which as show in FIG. 17c acts as a stop, while flipper 115 rotates upwardly about axis X.

FIGS. 17a through 17f schematically show the interaction between flipper 115 and dual pin 112 during insertion and withdrawal of connector 107 into or from adapter 110. On those diagrams arrows $F_R$ and $F_L$ represent right and left biasing forces created by two side legs 119 of the spring clip 114 (see FIG. 14). Those forces tend to keep flipper 115 in the neutral position when inactive. Arrows $P_{P1}$ represent the insertion force when connector 107 moves into the adapter 101 during the first "push" action. Arrows $P_C$ represent the force provided by the main connector spring (not shown in FIG. 17) which tends to either: (1) keep connector 107 in the mating position with the adapter 101 or, (2) pushes connector 107 out of the interior of adapter 101 after the second "push" action.

As shown in FIG. 17e, Arrow $P_{P2}$ represents a force of a second "push" action. Each of FIGS. 17a through 17f also has a virtual 2 mm ruler which shows the relative position of flipper's different elements described earlier and both square and circular elements of dual pin 112 during each step of the insertion and withdrawal processes.

In reference to FIGS. 17a through 17c, in operation, connection is initiated by pushing connector 107 in the direction of arrow $P_{P1}$ of FIG. 17a, until it is received in opening 106 of adapter 101 (FIG. 15). As square portion of pin 112 of connector 107 contacts and then slides along in contact with surface 126, it is guided along ramped cam surface 128 until it reaches the stopped position (FIG. 17c) by resting against angled surface 125. Further movement of connector 107 into the interior of adapter 101 is thus prohibited. Because flipper 115 is free to rotate about axis X, corresponding to pin 121 and hole 116, the spring force $F_R$ provided by the side legs 119 of spring clip 114 is overcome and flipper 115 rotates counterclockwise as viewed in FIG. 17b, until pin 112 reaches the stop position against surface 125 as shown in FIG. 17c. When connector 107 is released and no longer pushed inwardly into the interior of adapter 101, biasing forces $P_C$ of spring clip 114 tend to move flipper back to the center position of FIG. 17d, while ramped cam surfaces 128 and 129 tend to urge pin 112 downwardly into the mated position so as to abut surfaces 130 and 127 as shown in FIG. 17d by capturing square portion of pin 112 therein.

To unmate and withdraw connector 107 from adapter 101, connector 107 is again pushed inwardly along the longitudinal axis as viewed in FIGS. 17e and 17f and towards the interior of adapter 101. Pin 112 is then unseated from the mated position as follows. As inward force $P_{P2}$ is applied, pin 112 moves up ramped surface 129 and along surface 124 (so that it is no longer captured between surfaces 130 and 127) and it slides along surface 131. Once pin 112 is freed, connector 107 can then be withdrawn from adapter 101. Because flipper 115 can rotate about axis X, the biasing force $F_L$ is overcome and flipper 115 rotates clockwise as viewed in FIGS. 17e and 17f.

FIG. 18 shows the simplified version of the modular adapter/connector system 250 wherein modular contacts 251 are retained within body 252 by way of latches 255 trapped within openings 261. Holes 258 and 259 are provided for facilitated attachment of system 250 to a circuit board or the like. The simplified system 250 can be used instead of splicing the fibers to be connected.

Figure 19:
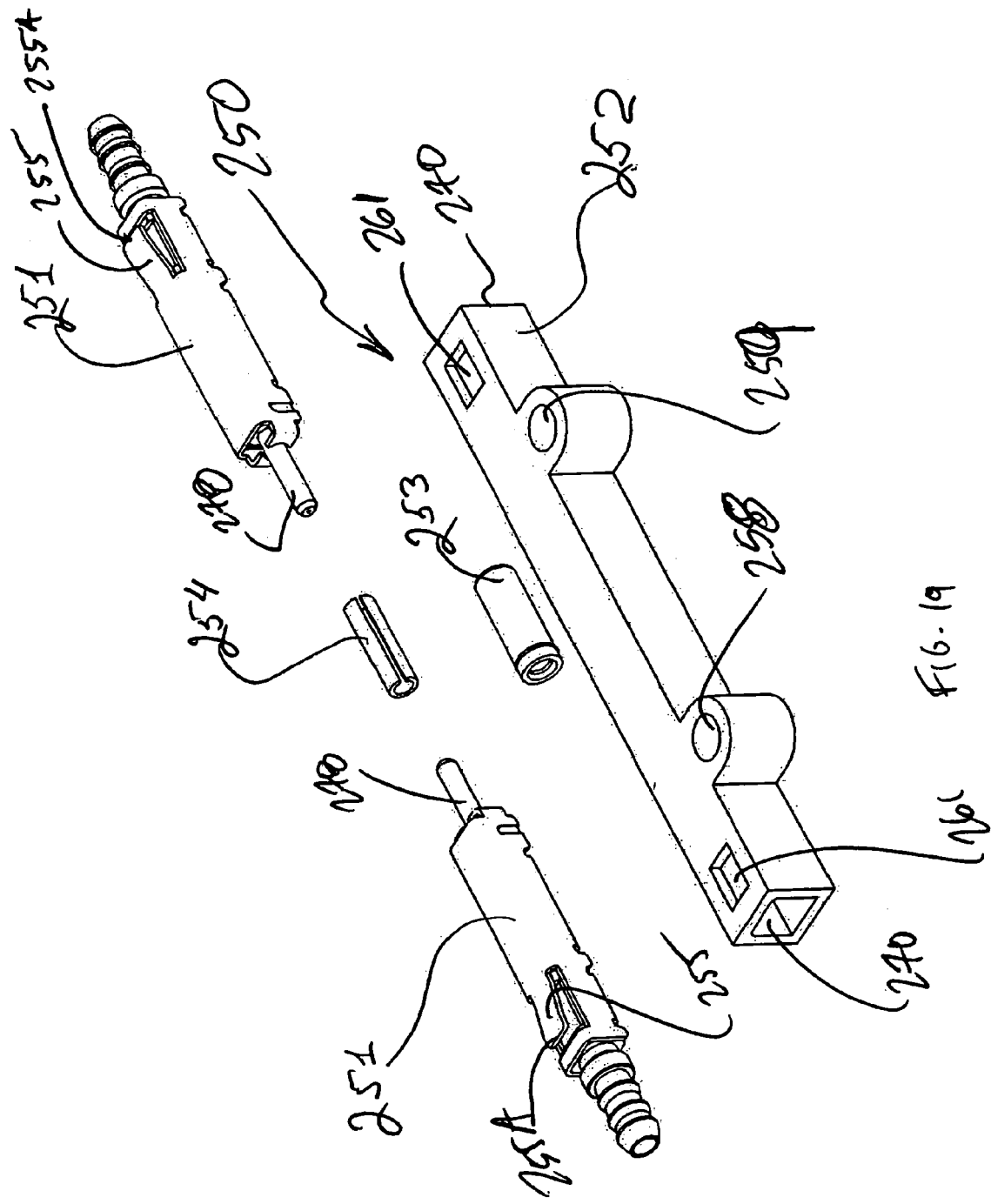
FIG. 19 is an exploded view of the simplified connector/adapter system 250 showing universal modular contacts 251, alignment sleeve 254, barrel 253 and body 252.

As shown in the exploded view of FIG. 19, the simplified modular adapter/connector system 250 includes: barrel 253 which surrounds alignment sleeve 254 in floating fashion. Modular contacts 251 are inserted through ends 270 of body 252. Ferrules 278 are thereby aligned in end-to-end fashion by alignment sleeve(s) 254, within barrel 253. Latches 255 of contacts 251 are captured and retained within openings 261 of body 252. To retract or withdraw contacts 251 from body 252, flanges are depressed downwards by a stylus or similar tool, until free ends 255A clear the bottom of openings 261 so that contacts 251 can be withdrawn from end openings 270 of body 252.

From the cross-sectional view provided in FIG. 20, ferrules 278 of contacts 251 can be seen in aligned and contacting end-to-end fashion within alignment sleeve 254, and in turn, within barrel 253 and within body 252. Latches 255 are biased upwards, so that when connectors 251 are inserted within ends 270 of body 252 and pushed inward along the interior of body 252, latches 255 will spring upwards into opening 261 of body 252. So long as end 255A of latch 255 stays above the bottom of openings 261, as shown in FIG. 20, contacts 251 will be securely retained within adapter body 252. To pull contacts 251 out of body 252, latch 255 must be pushed downward with a force sufficient to push latch 255 below the bottom of opening 261 to free end 255A from the sidewall 261A of opening 261 and thereby enable withdrawal of contacts 251 away from body 252.

Many modifications and variations of the present invention are possible in light of the above teachings. It is therefore to be understood that within the scope of the appended claims, the invention may be practiced otherwise than as specifically described. Various modifications, changes and variations may be made in the arrangement, operation and details of construction of the invention disclosed herein without departing from the spirit and scope of the invention. The present disclosure is intended to exemplify and not limit the invention.

We claim:

1. An optical fiber interconnect system comprising:
    a connector for carrying an optical fiber along a longitudinal axis;
    an adapter configured to operably connect with said connector;
    said adapter comprising a coupling mechanism configured to receive and couple with said connector upon application of only a first pushing force in a first direction to said connector at a first location so as to removably receive the connector in operably connected fashion; and
    said coupling mechanism being further capable of uncoupling said connector from said adapter upon the application of only a second pushing force in substantially the same direction and substantially the same location as the first pushing force, thereto so as to enable withdrawal of said connector from said adapter.

2. The system according to claim 1 wherein said pushing forces are applied along said longitudinal axis.

3. The system according to claim 1 wherein said connector further includes a pushing region on its exterior for applying said pushing forces.

4. An optical fiber interconnect system comprising:
    a connector for carrying an optical fiber along a longitudinal axis;
    an adapter configured to operably connect with said connector;
    said adapter comprising a coupling mechanism configured to receive and couple with said connector upon application of a first pushing force in a first direction to said connector at a first location so as to removably receive the connector in operably connected fashion;
    said coupling mechanism being further capable of uncoupling said connector from said adapter upon the application of a second pushing force in substantially the same direction and substantially the same location as the first pushing force, thereto so as to enable withdrawal of said connector from said adapter;
    said connector further including a pushing region on its exterior for applying said pushing forces; and,
    wherein a stylus member is used to apply said pushing forces to said pushing region.

5. A method of connecting and disconnecting an optical fiber connector and adapter comprising the steps of:
    applying only a first pushing force to said connector in a first direction towards said adapter until said adapter at a first location on said connector receives said connector;
    engaging said connector with said adapter in an operable arrangement; and,
    applying only a second pushing force to said connector towards said adapter a second time in substantially the same direction and at substantially the same location on said connector as the first pushing force so as to enable disengaging of said connector from said adapter withdrawal of said connector from said adapter.

6. A method of connecting and disconnecting an optical fiber connector and adapter comprising the steps of:
applying a first pushing force to said connector in a first direction towards said adapter until said adapter at a first location on said connector receives said connector;
engaging said connector with said adapter in an operable arrangement; and,
applying a second pushing force to said connector towards said adapter a second time in substantially the same direction and at substantially the same location on said connector as the first pushing force so as to enable disengaging of said connector from said adapter withdrawal of said connector from said adapter; and,
wherein said method further includes using a stylus member to apply said pushing forces to said connector for connecting and disconnecting said connector to and from said adapter.

7. An optical fiber interconnect system comprising:
a connector for carrying an optical fiber along a longitudinal axis;
an adapter configured to operably connect with said connector;
said connector further comprising a pin member affixed thereto, protruding therefrom and capable of entering the interior of said adapter;
said adapter comprising a coupling mechanism configured to receive and couple with said connector upon application of a first pushing force to said connector in a first direction and at a first location thereon so as to removably receive the connector in operably connected fashion;
said coupling mechanism further comprising a spring biased pivoting member capable of retaining said pin member when said adapter and connector are engaged as said first pushing force is applied to said connector; and,
said pivoting member being further capable of urging said pin member into a free position so as to disengage said connector from said adapter upon application of a second pushing force upon said connector in substantially the same direction and at substantially the same location as said first force and enable withdrawal of said connector from said adapter.

8. The invention of claim 7 wherein said first and second pushing forces are applied along the longitudinal axis in substantially the same direction.

9. The invention of claim 7 wherein said pin member comprises a portion thereof having a substantially square transverse cross-section for removable engagement with said pivoting member.

10. A modular fiber optic interconnect system comprising:
a ferrule plug having a longitudinal axis;
said ferrule plug comprising a spring loaded ferrule and a ferrule holder;
said ferrule holder configured to allow the ferrule to move in a first substantially transverse direction and a second substantially transverse direction relative to said longitudinal axis;
a shell for holding said ferrule plug having one or more limiters;
said ferrule plug and said shell being operably connected to each other so as to allow said ferrule to move axially along the longitudinal axis and in curvilinear translational fashion about the longitudinal axis when in contact with another ferrule, but not allowing rotation of said ferrule about said longitudinal axis;
a body having at least two openings at its ends that lead to its interior;
said body having at least two side openings that lead to its interior;
at least two connectors having ferrules capable of being received through said end openings of said body and within said body interior;
said connectors further comprising latches for engaging with said body at its side openings when fully inserted into said body interior;
said body further being capable of receiving said ferrules in operable, aligned end-to-end contact with the ferrule of another connector within said body;
said latches and said openings of said body being operably configured so that the connectors are disengaged from the body by application of a force through the side openings to disengage the latches from the body and enable withdrawal of the connector from the body;
an insert permitting movement of said ferrule within said body;
the insert having a movable plug so as to enable movement of said ferrule within said body while avoiding rotation of said ferrule relative to said optical axis; and,
wherein the plug can move inside of the insert in a second direction.

11. An optical fiber interconnect system comprising:
a modular contact comprising a ferrule having an optical axis for carrying an optical fiber along a longitudinal axis;
a connector plug configured to operably carry said modular contact;
an adapter comprising a first end configured to receive and couple with said modular contact so as to removably and securely receive the ferrule; and
the connector plug and adapter enabling non-rotational movement of the ferrule relative to the optical axis, including translation of the ferrule in a first transverse direction and a second transverse direction relative to the longitudinal axis;
the modular contact having a stationary body outside said ferrule and an internal opening in communication with an internal opening through said ferrule;
an insert permitting movement of said ferrule within said body; and
the insert having a movable plug so as to enable movement of said ferrule within said body while avoiding rotation of said ferrule relative to said optical axis; and,
wherein the plug can move inside of the insert in a second direction.

12. The invention of claim 11 wherein said insert can move in a first direction relative to the optical axis.

13. The invention according to claim 11 wherein said modular contact is tunable to increase performance.

14. The invention according to claim 11 wherein said contact further includes:
a plug extender configured to be received within said internal opening of said contact and move from a first position with a first end extending partially outside of said contact to a second position within said contact; and,
said plug extender configured to prevent optic fiber passing through it from incurring macro-bending and micro-bending.

15. An optical fiber interconnect system comprising:
a modular contact comprising a ferrule having an optical axis for carrying an optical fiber along a longitudinal axis;
a connector plug configured to operably carry said modular contact;
an adapter comprising a first end configured to receive and couple with said modular contact so as to removably and securely receive the ferrule;
the connector plug and adapter enabling non-rotational movement of the ferrule relative to the optical axis, including translation of the ferrule in a first transverse direction and a second transverse direction relative to the longitudinal axis;
said modular contact further comprising:
the modular contact having a stationary body outside said ferrule and an internal opening in communication with an internal opening through said ferrule;
an insert permitting movement of said ferrule within said body; and
the insert having a movable plug so as to enable movement of said ferrule within said body while avoiding rotation of said ferrule relative to said optical axis; and,
wherein the plug can move inside of the insert in a second direction.

16. The invention of claim 15 wherein said insert can rotate relative to said plug to provide an additional degree of freedom of non-rotational movement of the ferrule relative to the optical axis.

17. The invention according to claim 16 wherein said plug can rotate relative to said insert so as to provide an additional degree of freedom of non-rotational movement of the ferrule relative to the optical axis.

18. An optical fiber interconnect system comprising:
a modular contact comprising a ferrule having an optical axis for carrying an optical fiber along a longitudinal axis;
a connector plug configured to operably carry said modular contact;
an adapter comprising a first end configured to receive and couple with said modular contact so as to removably and securely receive the ferrule;
the connector plug and adapter enabling non-rotational movement of the ferrule relative to the optical axis,
a plug extender configured to be received within said internal opening of said contact and move from a first position with a first end extending partially outside of said contact to a second position within said contact;
said plug extender configured to prevent optic fiber passing through it from incurring macro-bending and micro-bending; and,
said plug extender is substantially rigid so that in its first position the plug extender facilitates accurate insertion of adhesive and said extender can operably slide along the interior of the contact to said second position and frictionally engage with said internal opening to maintain its second position.

19. An optical fiber interconnect system comprising:
a modular contact comprising a ferrule having an optical axis for carrying an optical fiber;
a connector plug configured to operably carry said modular contact;
an adapter comprising a first end to receive and couple with said modular contact by applying only a first pushing force to the connector plug, so as to removably and securely receive the ferrule;
said adapter uncoupling from said connector plug by applying only a second pushing force to the connector plug in substantially the same direction as the first force; and,
the connector plug and adapter enabling the use of sub-millimeter diameter ferrules and sleeves.

20. A modular optical fiber interconnect system comprising:
a modular connector plug carrying a ferrule;
an adapter capable of receiving the connector plug;
said adapter configured to couple with the connector upon application of only a first pushing force to the connector in a first direction and at a first location thereof;
said adapter configured to uncouple from the connector by application of only a second pushing force to the connector in substantially the same direction and at substantially the same location as the first pushing force; and
a locking mechanism operably associated with both the plug and the adapter so as to keep plug and adapter together, wherein said locking mechanism is operably associated with the connector plug so as to facilitate its use with sub-micron diameter ferrules.

21. A modular contact assembly comprising:
a ferrule plug having a longitudinal axis;
said ferrule plug comprising a spring loaded ferrule and a ferrule holder;
said ferrule holder configured to allow the ferrule to move in a first substantially transverse direction and a second substantially transverse direction relative to said longitudinal axis;
a shell for holding said ferrule plug having one or more limiters;
said ferrule plug and said shell being operably connected to each other so as to allow said ferrule to move axially along the longitudinal axis and in curvilinear translational fashion about the longitudinal axis when in contact with another ferrule, but not allowing rotation of said ferrule about said longitudinal axis;
an insert permitting movement of said ferrule within said body;
the insert having a movable plug so as to enable movement of said ferrule within said body while avoiding rotation of said ferrule relative to said optical axis; and,
wherein the plug can move inside of the insert in a second direction.

22. The invention according to claim 21 wherein said spring loading of said spring loaded ferrule is provided by a coil spring serving to bias said spring loaded ferrule forward within said shell.

23. The invention according to claim 21 wherein said ferrule holder comprises a flange with at least one flat region about its periphery for engagement with said limiters of said shell to prevent rotation of said spring loaded ferrule about said longitudinal axis.

24. The invention according to claim 21 further including a collar on said ferrule holder to prevent rotation of said spring loaded ferrule about said longitudinal axis.

25. The assembly of claim 21 wherein said first and second transverse directions are substantially perpendicular to each other.

* * * * *